(12) United States Patent
Gustafson et al.

(10) Patent No.: US 10,970,634 B2
(45) Date of Patent: Apr. 6, 2021

(54) METHODS AND SYSTEMS FOR CAPTURING ANALYTIC MODEL AUTHORING KNOWLEDGE

(71) Applicant: GENERAL ELECTRIC COMPANY, Schenectady, NY (US)

(72) Inventors: Steven Matt Gustafson, Niskayuna, NY (US); Kareem Sherif Aggour, Niskayuna, NY (US); Paul Edward Cuddihy, Ballston Lake, NY (US); Alfredo Gabaldon Royval, Clifton Park, NY (US); Justin Despenza McHugh, Latham, NY (US); Luis Babaji Ng Tari, Nashua, NH (US)

(73) Assignee: General Electric Company, Schenectady, NY (US)

( * ) Notice: Subject to any disclaimer, the term of this patent is extended or adjusted under 35 U.S.C. 154(b) by 923 days.

(21) Appl. No.: 15/347,887

(22) Filed: Nov. 10, 2016

(65) Prior Publication Data
US 2018/0129941 A1 May 10, 2018

(51) Int. Cl.
*G06N 5/02* (2006.01)
*G06N 20/00* (2019.01)
*G06Q 10/04* (2012.01)

(52) U.S. Cl.
CPC ............ *G06N 5/02* (2013.01); *G06N 20/00* (2019.01); *G06Q 10/04* (2013.01)

(58) Field of Classification Search
CPC ................................ G06Q 10/04; G06N 5/02
See application file for complete search history.

(56) References Cited

U.S. PATENT DOCUMENTS 7,577,683 B2    8/2009  Cho et al.
8,560,480 B2 *  10/2013 Du ........................... G06N 5/02
                                                            706/47

(Continued)

OTHER PUBLICATIONS

Mitkas, P. (2005). "Knowledge discovery for training intelligent agents: methodology, tools and applications." International Workshop on Autonomous Intelligent Systems: Agents and Data Mining. Springer, Berlin, Heidelberg, 2005. (Year: 2005).*

(Continued)

*Primary Examiner* — Kamran Afshar
*Assistant Examiner* — Benjamin J Buss
(74) *Attorney, Agent, or Firm* — Buckley, Maschoff & Talwalkar LLC

(57) ABSTRACT

Some embodiments are directed to systems for authoring predictive models. An embodiment includes a computer system implementing a development environment for generating predictive models. The predictive model authoring tool is configured to perform a modeling operation based on one or more user inputs provided to interface controls of the predictive model authoring tool, determine a modeling context for the modeling operation, log the one or more user inputs, generate a predictive model based on one or more model parameters defined during the modeling operation, link the predictive model to an asset, such that one or more sets of data received from the asset are provided to the predictive model during execution of the predictive model, cause the predictive model to be executed such that the predictive model receives data from the asset, and provide the modeling context, the one or more user inputs, and the one or more model parameters.

19 Claims, 11 Drawing Sheets

(56) References Cited

U.S. PATENT DOCUMENTS

| | | |
|---|---|---|
| 8,909,653 B1 | 12/2014 | Su |
| 9,213,771 B2 | 12/2015 | Chen et al. |
| 9,235,806 B2 | 1/2016 | Sweeney et al. |
| 10,366,114 B2* | 7/2019 | Bendig ............... G06F 16/2282 |
| 2002/0044296 A1* | 4/2002 | Skaanning .......... G06F 11/0733 |
| | | 358/1.14 |
| 2002/0169737 A1 | 11/2002 | Armstrong et al. |
| 2012/0158623 A1* | 6/2012 | Bilenko ................ G06N 20/00 |
| | | 706/12 |
| 2013/0124574 A1* | 5/2013 | Brettin .................. G16B 50/00 |
| | | 707/798 |
| 2014/0073882 A1* | 3/2014 | Choi ..................... G16H 50/20 |
| | | 600/301 |
| 2014/0280307 A1 | 9/2014 | Gupta et al. |
| 2014/0297644 A1 | 10/2014 | Cheng |
| 2014/0335480 A1* | 11/2014 | Asenjo .................. G09B 19/18 |
| | | 434/107 |
| 2014/0365191 A1* | 12/2014 | Zyglowicz .......... G06F 17/5009 |
| | | 703/7 |
| 2015/0095303 A1 | 4/2015 | Sonmez et al. |
| 2016/0042296 A1 | 2/2016 | Shan et al. |
| 2017/0277693 A1* | 9/2017 | Mehedy ................ G06N 5/022 |
| 2017/0308802 A1* | 10/2017 | Ramsoy ................ G06N 7/005 |
| 2018/0121170 A1 | 5/2018 | Subramaniyan et al. |
| 2018/0121171 A1 | 5/2018 | Subramaniyan et al. |
| 2018/0121183 A1 | 5/2018 | Subramaniyan et al. |
| 2018/0121258 A1 | 5/2018 | Subramaniyan et al. |
| 2018/0129941 A1* | 5/2018 | Gustafson ............... G06N 5/02 |

OTHER PUBLICATIONS

Bhogal, J. et al. (Online Oct. 23, 2006). "A review of ontology based query expansion". Information Processing and Management 43 (2007) 866-886. (Year: 2006).*

Bischl, B. et al. (2012). "Algorithm Selection Based on Exploratory Landscape Analysis and Cost-Sensitive Learning". GECCO'12, Jul. 7-11, 2012, Philadelphia, Pennsylvania, USA. (Year: 2012).*

Royval, A. G., et al., Methods And Systems For Identifying Gaps In Predictive Model Ontology, GE Co-Pending U.S. Appl. No. 15/354,235, filed Nov. 17, 2016

Extended European Search Report and Opinion issued in connection with corresponding EP Application No. 17200533.2 dated Mar. 13, 2018.

Strohmaier et al., Studying Databases of Intentions: Do Search Query Logs Capture Knowledge about Common Human Goals?, Proceedings of the fifth international conference on Knowledge capture, Sep. 4, 2009, pp. 89-96.

Strohmaier et al., "Acquiring knowledge about human goals from Search Query Logs", Information Processing & Management, vol. 48, Issue 1, pp. 63-82, Jan. 2012.

Hakkani-Tur et al.,"Using a knowledge graph and query click logs for unsupervised learning of relation detection", 2013 IEEE International Conference on Acoustics, Speech and Signal Processing, pp. 8327-8331, May 26-31, 2013.

* cited by examiner

METHODS AND SYSTEMS FOR CAPTURING ANALYTIC MODEL AUTHORING KNOWLEDGE

BACKGROUND

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often considers both the physics of the task at hand, as well as the environment in which such assets are configured to operate.

Low-level software and hardware-based controllers have long been used to drive industrial assets. However, the rise of inexpensive cloud computing, increasing sensor capabilities, and decreasing sensor costs, as well as the proliferation of mobile technologies have created opportunities for creating novel industrial assets with improved sensing technology that are capable of transmitting data that can then be transmitted to a network.

By transmitting locally acquired sensor and environment data to a computing infrastructure, this data may be processed and analyzed to measure and predict the behavior of the underlying assets. Predictive models can assist with determining the likelihood of particular outcomes based on sensor data received from the asset, past performance of the same or similar assets, predicted future performance of the same or similar assets, and the like.

The development of these predictive models is often laborious and time consuming, requiring users to have intimate knowledge of the underlying assets and sophisticated data science and statistical or machine learning modeling techniques. Such models must be manually coded by software developers, tested and validated against data sets, and subsequently published for execution against "live" data received from assets.

It would therefore be desirable to provide authoring tools that leverage predetermined knowledge to improve the process of developing, generating, and executing predictive models.

SUMMARY

Some embodiments generally relate to methods and systems for providing improved capture and usage of knowledge during predictive model authoring operations. Embodiments include authoring tools that capture information related to the type of asset being modeled, components and subcomponents of that asset, features of the sensor data, particular data analysis and modeling techniques applied to those features, and other aspects of a predictive model authoring process. This captured information is mapped to particular tasks of a predictive model authoring process such that knowledge about the authoring of that predictive model is captured. This knowledge is indexed in a manner so as to facilitate further predictive modeling authoring operations.

An embodiment provides a computer system implementing a development environment for generating predictive models using model parameters provided by a predictive model authoring tool. The system includes the predictive model authoring tool. The predictive model authoring tool is configured to perform a modeling operation based on one or more user inputs provided to interface controls of the predictive model authoring tool, determine a modeling context for the modeling operation, log the one or more user inputs, generate a predictive model based on one or more model parameters defined during the modeling operation, link the predictive model to an asset, such that one or more sets of data received from the asset are provided to the predictive model during execution of the predictive model, cause the predictive model to be executed such that the predictive model receives data from the asset, provide the modeling context, the one or more user inputs, and the one or more model parameters to a model development context analyzer, receiving, from the model development context analyzer, derived modeling knowledge, the derived modeling knowledge based at least in part on the provided modeling context, the one or more user inputs, or the one or more model parameters, and display the derived modeling knowledge via a knowledge display interface.

The set of derived modeling knowledge may be displayed as a knowledge graph. The predictive model may be executed via a model execution platform. The modeling context may be determined based on an input to an interface control provided to allow selection of a particular modeling operation. The modeling context may be at least one of creation of a new model, editing of an existing model, or linking an existing model to a new asset. The modeling context may further include a particular asset type.

An embodiment provides a computer system implementing at least a portion of a development environment for generating predictive models using model parameters provided by a predictive model authoring tool. The system is configured to receive, from a predictive model authoring tool, a first set of context data based at least in part on one or more user interactions with the predictive model authoring tool during a modeling operation, process the context data to determine a first at least one element of an ontology related to the modeling operation and at least one value associated with the first at least one element of the ontology, store the at least one value in a database, wherein a database schema of the database is derived at least in part based on the ontology, receive a second set of context data from the predictive model authoring tool, determine a second at least one element of the ontology based on the second set of context data, query the database using the second at least one element of the ontology to determine at least one database query result, and provide the at least one database query result to the predictive model authoring tool for use in a modeling operation.

The at least one database query result may be provided to the predictive model authoring tool is formatted into a knowledge graph representation. The system may be further configured to determine the first at least one element of the ontology by identifying at least one modeling task from the context data, wherein the first at least one element of the ontology is associated with the at least one modeling task. The first set of context data may include a set of input logs generated by the predictive model authoring tool during a modeling operation, and wherein processing the first set of context data comprises determining at least one modeling task attribute from the set of input logs. The first set of context data may include a predefined context, and wherein determining the at least one modeling task attribute is performed using an input to task mapping selected from a plurality of input to task mappings based at least in part on the predefined context. The ontology may be stored as a tree structure, wherein at least one parent node of the tree structure represents a modeling task, and wherein at least one child node of the at least one parent node represents an attribute of the first modeling task. The child node may be associated with a different modeling task from the first modeling task.

An embodiment includes a method for providing an improved predictive model authoring system. The method includes receiving, at a computing node, a first set of context data from a predictive model authoring tool, the first set of context data comprising an input log of user interactions with the predictive model authoring tool and a first predefined context, the first predefined context indicating at least one modeling task performed during the user interactions represented in the input log, processing the first set of context data to determine one or more task attributes for the at least one modeling task, determining an element of an ontology based on the first predefined context, storing the one or more task attributes in a database based on the element of the ontology, where the ontology represents at least a portion of a schema of the database, receiving a second set of context data from the predictive model authoring tool, the second set of context data comprising the first predefined context or a second predefined context different from the first predefined context, extracting data from the database in response to receiving the second set of context data, wherein the extracted data is related to the first predefined context or the second predefined context, and transmitting the extracted data to the predictive model authoring tool.

The extracted data may be transmitted as a knowledge graph representation. The ontology may be stored as a tree structure, wherein at least one parent node of the tree structure represents a modeling task, and wherein at least one child node of the at least one parent node represents an attribute of the modeling task. The extracted data may be formatted as a knowledge graph representation prior to transmitting the extracted data to the predictive model authoring tool. The at least one modeling task may be at least one of data filtering, data preprocessing, data visualization, goal selection, or model parameter selection. The transmitted extracted data may include at least one model parameter for use by the predictive model authoring tool as a suggested parameter. The predictive model authoring tool may be executed on the computing node.

DETAILED DESCRIPTION

Overview and Definitions

Figure 1:
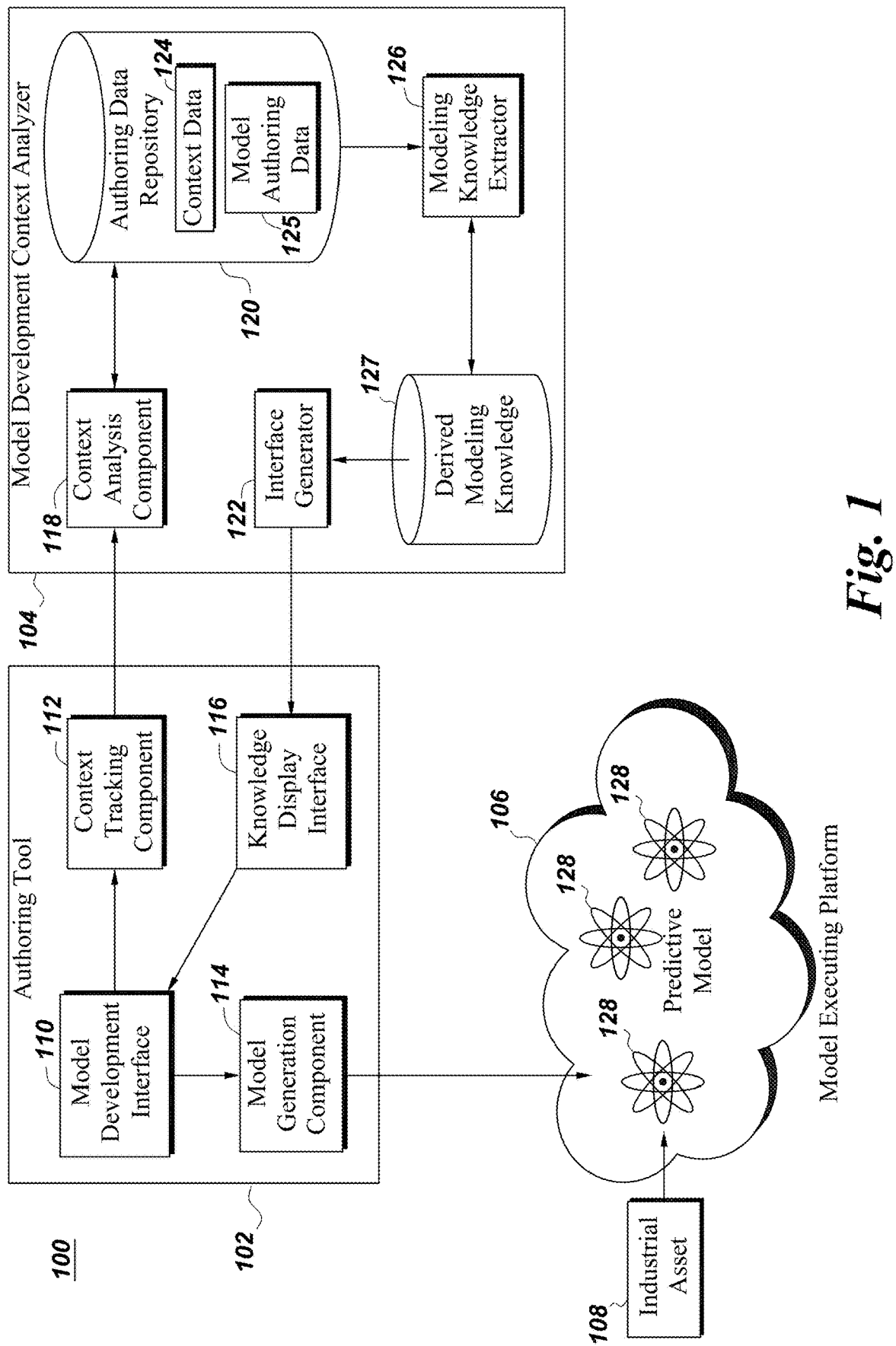
FIG. 1 depicts a system diagram of a model execution platform in communication with components of a predictive model authoring system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

As advances in technology have led to the ability to retrieve accurate, real- or near real-time data from remotely located assets, systems have been developed to leverage this data to provide improved predictive and modeling capabilities for performance of those assets and similar assets. Asset management platforms (AMPs) such as the Predix™ platform offered by General Electric offer state-of-the-art cutting edge tools and cloud computing techniques that enable the incorporation of a manufacturer's asset knowledge with a set of development tools and best practices. Using such a system, a manufacturer of industrial assets can be uniquely situated to leverage its understanding of industrial assets themselves, models of such assets, and industrial operations or applications of such assets, to create new value for industrial customers through asset insights.

However, developing code to offer these benefits requires developers to both understand the underlying asset hardware in fine detail and to have an intimate understanding of data science and predictive modeling techniques. The required intersection of these skillsets restricts the subset of users able to fully leverage access to AMPs and other predictive modeling platforms to a relatively small segment of the population.

Recognizing these difficulties and other technical challenges, the inventors have developed authoring tools and integrated development environments (IDEs) that simplify the process of authoring, compiling, and executing predictive models by leveraging knowledge captured during other predictive modeling operations.

To this end, the inventors have created authoring tools that capture input during a predictive model authoring operation and store and analyze that input to map aspects of the predictive model authoring process to certain tasks. These tasks are used to derive information related to the modeling process that is packaged into the authoring tool for use in future modeling operations. In this manner, the authoring tool offers a self-teaching interface that dynamically provides information related to past features, analysis techniques, and other model metadata for use in future model authoring operations. Thus, embodiments provide improved techniques for authoring and executing predictive models and analytics using contextual analysis and interface monitoring techniques.

As used herein, the term "predictive model" refers to computer code that, when executed, receives a set of input data and applies statistical or machine learning modeling techniques to that set of input data to predict an outcome. The term "predictive model" should further be understood to refer to analytics that result from training the predictive model using a set of input data according to a particular statistical or machine learning technique. As used herein, references to the process of "authoring" the predictive model should be understood to refer to process of selecting input data, features of the input data, measured outcomes, the desired analytical technique(s), whether the model is self-training, and other characteristics of the process by which the resulting analytic is generated and executes.

As used herein, the term "modeling operation" is understood to refer to an act of interacting with an authoring tool IDE to generate, define, edit, delete, refine, or copy a predictive model or the definition thereof. The terms "task" and "modeling task" in the context of this application are understood to refer to particular elements of a modeling operation, such as defining particular parameters of the model, selecting particular assets for pairing with the model, creating a new model, editing an existing model, copying a model, linking an existing model to a new asset, or the like. The term "context data" is understood to refer to data gathered during a modeling operation by an authoring tool IDE, such as user interactions with interface controls of the authoring tool IDE, text entered into a search field, or the like.

For the purposes of this disclosure, a predictive model that is paired to a particular industrial asset is referred to as a "digital twin" of that asset. A given digital twin may employ multiple predictive models associated with multiple components or subcomponents of the asset. In some scenarios, a digital twin of a particular asset may include multiple predictive models for predicting different behaviors or outcomes for that asset based on different sets of sensor data received from the asset or from other sources. A predictive model or set of predictive models associated with a particular industrial asset may be referred to as "twinned" to that asset.

A twinned asset may be either operating or non-operating. When non-operating, the digital twin may remain operational and its sensors may keep measuring their assigned parameters. In this way, a digital twin may still make accurate assessments and predictions even when the twinned physical system is altered or damaged in a non-operational state. Note that if the digital twin and its sensors were also non-operational, the digital twin might be unaware of significant events of interest.

A digital twin may be placed on a twinned physical system and run autonomously or globally with a connection to external resources using the Internet of Things (IoT) or other data services. Note that an instantiation of the digital twin's software could take place at multiple locations. A digital twin's software could reside near the asset and be used to help control the operation of the asset. Another location might be at a plant or farm level, where system level digital twin models may be used to help determine optimal operating conditions for a desired outcome, such as minimum fuel usage to achieve a desired power output of a power plant. In addition, a digital twin's software could reside in the cloud, implemented on a server remote from the asset. The advantages of such a location might include scalable computing resources to solve computationally intensive calculations required to converge a digital twin model producing an output vector $\bar{y}$.

It should be noted that multiple but different digital twin models for a specific asset, such as a gas turbine, could reside at all three of these types of locations. Each location might, for example, be able to gather different data, which may allow for better observation of the asset states and hence determination of the tuning parameters, $\bar{a}$, especially when the different digital twin models exchange information.

A "Per Asset" digital twin may be associated with a software model for a particular twinned physical system. The mathematical form of the model underlying similar assets may, according to some embodiments, be altered from like asset system to like asset system to match the particular configuration or mode of incorporation of each asset system. A Per Asset digital twin may comprise a model of the structural components, their physical functions, and/or their interactions. A Per Asset digital twin might receive sensor data from sensors that report on the health and stability of a system, environmental conditions, and/or the system's response and state in response to commands issued to the system. A Per Asset digital twin may also track and perform calculations associated with estimating a system's remaining useful life.

A Per Asset digital twin may comprise a mathematical representation or model along with a set of tuned parameters that describe the current state of the asset. This is often done with a kernel-model framework, where a kernel represents the baseline physics of operation or phenomenon of interest pertaining to the asset. The kernel has a general form of:

$$\bar{y}=f(\bar{a},\bar{x})$$

where $\bar{a}$ is a vector containing a set of model tuning parameters that are specific to the asset and its current state. Examples may include component efficiencies in different sections of an aircraft engine or gas turbine. The vector $\bar{x}$ contains the kernel inputs, such as operating conditions (fuel flow, altitude, ambient temperature, pressure, etc.). Finally, the vector $\bar{y}$ is the kernel outputs which could include sensor measurement estimates or asset states (part life damage states, etc.).

When a kernel is tuned to a specific asset, the vector $\bar{a}$ is determined, and the result is called the Per Asset digital twin model. The vector $\bar{a}$ will be different for each asset and will change over its operational life. The Component Dimensional Value table ("CDV") may record the vector $\bar{a}$. It may be advantageous to keep all computed vector $\bar{a}$'s versus time to then perform trending analyses or anomaly detection.

A Per Asset digital twin may be configured to function as a continually tuned digital twin, a digital twin that is continually updated as its twinned physical system is in operation, an economic operations digital twin used to create demonstrable business value, an adaptable digital twin that is designed to adapt to new scenarios and new system configurations and may be transferred to another system or class of systems, and/or one of a plurality of interacting digital twins that are scalable over an asset class and may be broadened to not only model a twinned physical system but also provide control over the asset.

Predictive Model Authoring Knowledge Capture
System Overview

FIG. 1 is a high-level architecture of a system 100 in accordance with some embodiments. The system 100 provides functionality that enables the authoring and execution of one or more predictive models. The system 100 advantageously provides for improved predictive model authoring capabilities by capturing context information during a model development process and deriving knowledge about the created predictive models and the predictive model authoring process from the captured context data. The derived knowledge may be employed to assist with future predictive model authoring processes. As such, the system advantageously provides mechanisms for improved authoring of predictive models, improved pairing of predictive models to industrial assets, and improved execution of those predictive models in a cloud computing framework.

The system 100 includes one or more industrial assets 108 coupled to a model execution platform 106 that executes one or more predictive models 128. These predictive models may be, as noted above, digital twins paired to the one or more industrial assets 108. The system further includes one or more authoring tools 102 and a model development context analyzer 104.

In some embodiments, the authoring tools 102 are client devices that communicate with a remote model development context analyzer 104, such that each of the authoring tools 102 sends and receives data to the model development context analyzer according to a client-server relationship. It is contemplated that the model development context analyzer 104 may function to receive data from multiple authoring tools 102 such that modeling knowledge can be derived from multiple authoring tool interactions across users and organizations. It should be readily appreciated that, while the authoring tool 102 may gather user data for the purposes of transmission to the model development context analyzer 104, such information gathering is typically performed in an "opt in" manner such that users of the authoring tool are aware of and consent to data transmissions to the model development context analyzer. In some circumstances, acceptance of this data transmission may be a prerequisite for use of the modeling tool or some components or features thereof (e.g., in order to access derived modeling knowledge, the user may need to consent to providing their own context data). Some examples of embodiments of authoring tools as may be employed with embodiments of the present invention are described further with respect to U.S. patent application Ser. Nos. 15/338,839, 15/338,886, 15/338,922, and 15/338,951, filed on Oct. 31, 2016, which are herein incorporated by reference in their entirety.

The model execution platform 106 is a platform or framework that provides for data ingestion and execution of the predictive models 128. This platform may be implemented on a particular asset itself (e.g., within an asset controller), on a particular computing node or server, or as part of a cloud-computing framework or AMP (e.g., Predix™).

The model authoring tool 102 functions to generate one or more of the predictive models 128. Once generated by the model authoring tool 102, predictive models may be published by the model authoring tool 102 to the model execution platform 106 for execution. Publication of those predictive models 128 may cause the predictive models 128 to begin execution. Upon execution, those predictive models 128 may begin ingesting data from one or more of the industrial assets 108, thereby enabling the predictive models 128 to automatically update based on the new data to improve its prediction accuracy as it is accessed or queried by external processes, nodes, interfaces, or assets (not pictured) to make predictions.

The process of generating a predictive model may include multiple tasks, both user-defined (e.g., specifying the type of industrial asset at issue, selecting a particular modeling technique, selecting particular features to model), and automated (e.g., compiling and linking together different code libraries based on the user-designed capabilities of the model, storing the machine-executable code for the model in a datastore, publishing the model to the model execution platform 106, and the like). To facilitate these processes, the authoring tool 102 may be implemented as an integrated development environment (IDE). To this end, the authoring tool 102 includes multiple interfaces and components to improve the process of generating a predictive model.

The authoring tool 102 includes a model development interface 110. The model development interface 110 provides a user interface that enables an author to select particular defining parameters for that model. These parameters may include, but are not limited to, the particular asset, component, or sub-component being modeled, the data features ingested by the predictive model, any preprocessing/data cleaning steps to perform on those features, the analytic applied to the data features to generate a result, specific values of parameters used to configure the analytic (e.g., number of nodes and layers in a deep learning neural network model, maximum order for a regression model), and training and testing data sets used for statistical and/or machine learning processes for developing the model.

Upon selecting the parameters for the model within the model development interface 110, those parameters may be received by a model generation component 114 and used to generate a corresponding predictive model. The model generation component 114 may use the various parameters to identify particular source code files, libraries, classes, data interface components, microservices, and the like to be compiled and/or linked together to create the predictive model in a format that may allow the predictive model to be executed via the model execution platform 106. The model generation component 114 may subsequently publish the generated predictive model to the model execution platform 106. Publication of the generated predictive model may include, for example, providing executable code to the model execution platform, providing a set of metadata associated with the generated model to the model execution platform, notifying the model execution platform of the presence of the newly generated model, and linking the predictive model to a particular asset or assets. These functions may be provided by microservices provided by the model execution platform 106 and/or through a platform Application Programming Interface (API). In some embodiments, publication of the generated predictive model may cause the predictive model to begin ingesting data provided from one or more linked industrial assets (e.g., the industrial asset 108) via the model execution platform 106, while in other embodiments the generated predictive model may remain dormant within the model execution framework 106 until receiving further instructions to begin execution and/or data ingestion.

The model development interface 110 may also provide access to a knowledge display interface 116. The knowledge display interface 116 provides a mechanism for displaying a set of knowledge about predictive models as derived from prior modeling operations. The knowledge display interface 116 may include, for example, one or more graphical user interfaces for communicating model parameters used in previous modeling operations. These model parameters may be indexed by, for example, the type of asset, component, or sub-component being modeled, the user or user organization that created the prior models, particular types of analytics employed, particular model features or source data sets, or the like. Examples of graphical user interfaces that may be displayed via the knowledge display interface are described further below with respect to FIGS. 7 and 8.

During a model authoring operation, a user accessing the model development interface 110 may be presented with relevant modeling knowledge through the knowledge display interface 116. The graphical user interfaces provided by the knowledge display interface 116 may allow the user to search, sort, and index derived modeling knowledge to assist with the selection of particular modeling parameters for a newly generated model. For example, the user may indicate they are generating a predictive model for a particular asset type via the model development interface (e.g., an aircraft engine). The knowledge display interface 116 may, upon receiving an electronic notification of the asset type being modeled, present various model parameters associated with previously generated assets of the same type, similar types, or the like.

To populate the knowledge display interface 116, the system employs a model development context analyzer 104. The model development context analyzer 104 receives modeling context information, derives modeling knowledge from the model context information, and generates an interface for viewing or accessing that knowledge. To this end, the authoring tool 102 includes a context tracking component 112.

The context tracking component 112 captures context data during a model authoring process and stores and/or transmits that context data for the purpose of facilitating a knowledge derivation process. The captured context data may include, but is not limited to, user interactions with particular menus and/or controls of the model development interface 110, user selections of particular model parameters, information related to a particular user account (e.g., user account roles, user organization), and information related to inferred or explicitly stated intent. Embodiments may allow or require a user to indicate the modeling operation they are accomplishing via the model development interface 110 at various degrees of granularity. For example, a user may indicate they are building a predictive model for a particular type of asset (e.g., an aircraft engine), a particular subtype of asset (e.g., a particular model of aircraft engine), or a specific asset (e.g., a twin for an engine having serial number "1234567"). A user may also indicate other modeling operations related to management or editing of predictive models, such as "selecting a dataset on which to train a model," "apply specific data cleansing/data preprocessing operations to specific columns," "define parameters for the model kernel", or the like. Alternatively, in some embodiments the modeling operation may be inferred from the user interactions with the model development interface 110. The context tracking component 112 may store or transmit the captured context data such that the context data is accessible to the context analysis component 118 of the model development context analyzer 104.

The model development context analyzer 104 includes a context analysis component 118 for identifying particular tasks from context data. An authoring data repository 120 stores received context data 124 and model authoring task data 125. The context data 124 may include, for example, particular user interactions with the model development interface 110 (e.g., selected menus, cursor locations, interface controls, text inputs), and metadata about models authored via the model development interface (e.g., particular input data features, analytic techniques, asset types and subtypes, and the like). The model authoring task data 125 includes data identifying mappings between particular modeling tasks, modeling task attributes, and the received context data 124. For example, a given modeling operation may include selecting data sources, selecting data features provided by those data sources, defining an analytic to apply to the data features, selecting an output of that analytic, and determining how to process the output of that analytic to identify a particular result. The particular interactions with a model development interface 110 may map to different tasks or task attributes based on the particular modeling operation selected by the user or inferred from the user interactions with the model development interface 110. Some examples of operations of the context analysis component 118 are described in further details below with respect to FIGS. 4 and 7-8.

The context analysis component 118 populates the authoring data repository with the model authoring task data 125. The model authoring task data 125 may include records that, together, indicate the series of tasks and associated task attributes performed by some/all users accessing one or more of the authoring tools 102. A modeling knowledge extractor 126 may analyze the model authoring task data 125 derived by the context analysis component 118 to derive knowledge about the modeling process. This derived modeling knowledge 127 includes data that indicates relationships and correlations across model authoring operations. For example, the derived modeling knowledge 127 may result from the identification of correlations between particular features for particular asset types (e.g., most engine models receive a combustor temperature input value), particular models that are frequently used by users with certain roles (e.g., most data scientist users from aviation companies create engine models having certain input features), particular analytic types used for particular asset types (e.g., most wind turbine optimization models employ a recurrent neural network analytic type), and the like. Examples of processes for deriving this modeling knowledge as performed by the context analysis component 118 are described further below with respect to FIGS. 8 and 9.

An interface generator 122 may access the derived modeling knowledge 127 to format the derived modeling knowledge 127 in a manner suitable for accessing by the authoring tool. This formatted derived modeling knowledge 127 may be provided to the knowledge display interface 116 as an interface or series of interactive interface controls, such as an interactive knowledge graph. An example of an interface for displaying such interface controls is described further below with respect to FIGS. 7 and 8.

Figure 2:
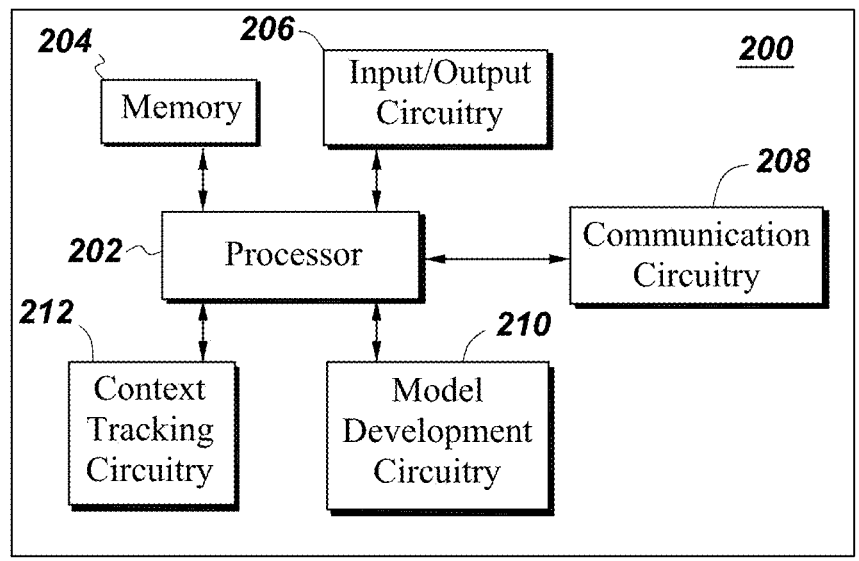
FIG. 2 depicts an example of hardware components of a predictive model authoring tool in accordance with some embodiments.
Figure 3:
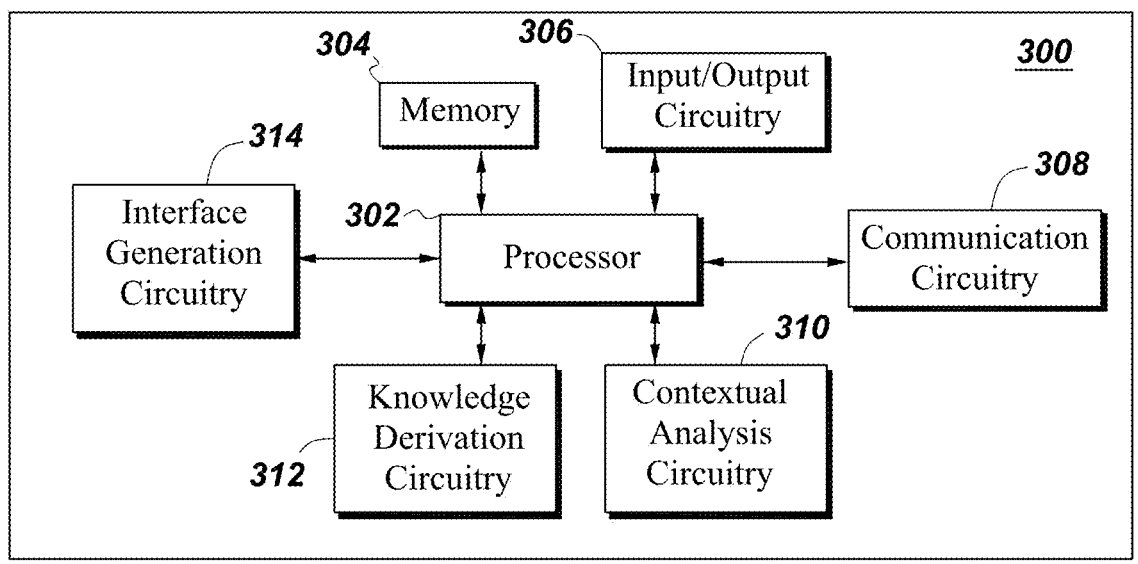
FIG. 3 depicts an example of hardware components of a model development context analyzer in accordance with some embodiments.

Examples of Computing Hardware for Implementing a Model Authoring Knowledge Capture System The various components of the system 100 may be implemented by one or more computing nodes having specially programmed hardware and software. FIGS. 2 and 3 illustrate examples of such hardware for implementing an authoring tool and model development context analyzer as described above with respect to FIG. 1, respectively.

FIG. 2. depicts an example of a computing device 200 including hardware for implementing an authoring tool, such as the authoring tool 102 described above with respect to FIG. 1. The computing device 200 may be any computing device operable for receiving model definitions and causing generation of a predictive model for execution via a model execution platform. In this regard, the computing device may be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. It should also be appreciated that, in some contexts, the computing device may comprise multiple such devices in a linked or networked architecture. For example, a graphical user interface may be provided by a "thin client" capable of execution on a mobile device, with server functions provided by a desktop or server computer. Such an implementation may allow for model definition via the client with the actual compilation, linking, and/or execution of the underlying code to generate the predictive model being performed by a server.

The computing device 200 of the illustrated example includes a processor 202. The processor 202 of the illustrated example is hardware, and may be implemented by one or more integrated circuits, logic circuits, microprocessors or controllers from any desired family or manufacturer. In the illustrated example, the processor 202 is structured in communication with a memory 204, input/output circuitry 206, communication circuitry 208, model development circuitry 210, and context tracking circuitry 212. Although the elements of the computing device 200 are described as discrete components, it should be appreciated that the components 202-212 may overlap in hardware and functionality. For example, elements of the model development circuitry 210 may incorporate or overlap with elements of the processor 202, the communication circuitry 208, the input/output circuitry, and the like. In some embodiments, the functionality of certain elements of the computing device 200 may be subsumed or covered completely by other elements of the device, such as in cases where an element of the computing device 200 is implemented via programmed hardware provided by another component of the computing device 200 (e.g., the processor 202 programmed by one or more algorithms).

The memory 204 may encompass any number of volatile and non-volatile storage devices, including but not limited to cache memory of the processor, system memory, mechanical or solid-state hard disk storage, network accessible storage (NAS) devices, redundant array of independent disk (RAID) arrays, or the like. Access to the memory 204 may be provided by one or more memory controllers implemented as hardware of the processor 202 and/or memory 204.

The computing device 200 also includes an input/output circuitry 206. The input/output circuitry 206 may be implemented by any type of interface standard, such as an Ethernet interface, a universal serial bus (USB), and/or a PCI express interface. The input/output circuitry 206 may provide for communication with one or more input devices that permit a user to enter data and commands to the computing device 200 and one or more output devices for enabling audible and visual components of a graphical user interface. For example, the input/output circuitry 206 may provide data interfaces for displaying an interface via a monitor and receiving inputs from a keyboard, mouse, touchscreen, or the like. The input/output circuitry 206 may enable a user to enter data and commands that are received by the processor 202 to perform various functions. As further examples, the input/output circuitry 206 may enable input via an audio sensor, a microphone, a camera (still or video), a keyboard, a button, a mouse, a touchscreen, a track-pad, a trackball, isopoint, a gesture input system, and/or a voice recognition system. Examples of output devices enabled by the input/output circuitry 206 include, but are not limited to display devices (e.g., a light emitting diode (LED), an organic light emitting diode (OLED), a liquid crystal display, a cathode ray tube display (CRT), a touchscreen, a tactile output device, a printer and/or speakers).

The communication circuitry 208 includes one or more communication devices such as a transmitter, a receiver, a transceiver, a modem and/or network interface card configured to facilitate exchange of data with external machines (e.g., computing devices of any kind, including but not limited to the model development context analyzer 104 and the model execution platform 106 described above with respect to FIG. 1) via a network (e.g., an Ethernet connection, a digital subscriber line (DSL), a telephone line, coaxial cable, a cellular telephone system, etc.).

The model development circuitry 210 includes hardware configured to provide model development functionality as described above with respect to FIG. 1. This hardware includes processing circuitry, such as the processor 202, that is programmed to provide an IDE interface for receiving model parameters and generating one or more predictive models. The model development circuitry 210 may further include processing circuitry programmed to provide interfaces for providing derived modeling knowledge to inform a predictive model authoring process. The processing circuitry of the model development circuitry 210 may, for example, receive model parameters, determine classes, code libraries, and the like for compilation into an executable, library or libraries, file archive, or other machine-readable format for transmission to and/or execution by a model development platform.

The context tracking circuitry 212 includes hardware configured to capture user interactions with the model development circuitry 210 as context data. In this manner, the context tracking circuitry 212 may provide the functionality described above with respect to the context tracking component 112 of FIG. 1. This hardware includes processing circuitry, such as the processor 202, that is programmed to track actions performed within an interface provided by the model development circuitry 210 during a modeling operation. The context tracking circuitry 212 stores the context data via a memory, such as the memory 204, and transmits the context data to a model development context analyzer via a bus or interface (e.g., a network interface), as provided by the communication circuitry 208.

FIG. 3 illustrates a computing device 300 including hardware configured to provide the functionality of a model development context analyzer 104 such as described above with respect to FIG. 1. The computing device 300 includes a processor 302, a memory 304, input/output circuitry 306, communication circuitry 308, contextual analysis circuitry 310, knowledge derivation circuitry 312, and interface generation circuitry 314. The processor 302, memory 304, input/output circuitry 306, and communication circuitry 308 are similarly configured to the corresponding elements described above with respect to the computing device 200 of FIG. 2, so in the interests of brevity, a detailed discussion of the functioning of this hardware will be omitted.

The contextual analysis circuitry 310 includes hardware configured to analyze context information received from an authoring tool and determine particular tasks of a modeling operation. The context data may be received, for example, from the authoring tool through the communication circuitry 308, and processed using one or more algorithms or techniques to program processing circuitry, such as the processor 302, to analyze the context data. The analyzed context data may include one or more metrics, values, or other calculations related to particular tasks identified from the context data. For example, the context data may include the number of times particular model features are selected, particular analytic techniques are used, particular outcomes are selected, or the like. These results may be indexed according to metadata associated with the model that is the subject of the modeling operation or the modeling operation itself. For example, the results may be indexed according to the type of asset being modeled, a subtype of the asset being model, one or more roles associated with a user authoring the model, the particular analytic type being selected, or the like. The analyzed context data may be stored, for example, in a memory, such as the memory 304.

The knowledge derivation circuitry 312 includes hardware configured to derive knowledge from the context data analyzed by the contextual analysis circuitry 310. In this regard, the knowledge derivation circuitry 312 is operable to analyze sets of model operation tasks and other model metadata derived from the analysis of context data captured during modeling operations to identify correlations, patterns, themes, and associations that may be relevant to users of model authoring tools. The knowledge derivation circuitry 312 may perform this analysis through the use of a priori known information about the modeling process that enables efficient indexing and categorization of context and task data. For example, the knowledge derivation circuitry 312 may identify common characteristics across models having a same type or subtype (e.g., models for aircraft engines typically use certain input features and predict certain outcome types).

In some embodiments, the knowledge derivation circuitry 312 may identify when a sufficient amount of data is present to identify a particular association. For example, the knowledge derivation circuitry 312 may apply a minimum correlation threshold (e.g., 60% of the time, 80% of the time, etc.) between a model type and a set of input data features before storing a relationship between the model type and input data features.

In yet further embodiments, the knowledge derivation circuitry 312 may function to dynamically identify gaps in the set of derived knowledge. The knowledge derivation circuitry 312 may store the derived modeling knowledge as a known ontology, and determine areas where the known ontology is not fully populated. For example, the knowledge derivation circuitry 312 may determine from context data that predictive models for engines typically have certain subcomponents (e.g., combustion chamber, pistons, etc.) based on a certain sample of engine models having those subcomponents. If a user defines a new model of an engine type that lacks certain characteristics that have been previously seen in similar models (e.g., an engine model with no subcomponents), the knowledge derivation circuitry 312 may note the gap in the derived model knowledge and take appropriate action. For example, the knowledge derivation circuitry 312 may modify a graphical user interface to indicate the gap in knowledge, generate an alert notification to the model author, or the like. As another example, the knowledge derivation circuitry 312 may generate a query (e.g., via a chat interface or other GUI) to a particular user who, based on past modeling operations or particular user roles, is identified by the knowledge derivation circuitry 312 as being an authority suitable for filling in the identified knowledge gap.

To perform these functions and other functions related to derivation of knowledge from user inputs and other context data, the knowledge derivation circuitry 312 employs processing circuitry, such as the processor 302, to analyze context data and derive knowledge. This knowledge may be stored in a memory, such as the memory 304, for later access or use. The knowledge may be used by other components of the computing device 300 for generation of a user interface for accessing the derived knowledge. Examples of data structures, processes, and algorithms for implementing the features of the contextual analysis circuitry 310 and the knowledge derivation circuitry 312 are described further below with respect to FIGS. 6-12.

The interface generation circuitry 314 includes hardware configured to generate a GUI for displaying knowledge derived by the knowledge derivation circuitry 312. In this regard, the interface generation circuitry 314 includes hardware that is operable to format stored data indicating the derived knowledge in a manner that enables a user of the GUI to search through and index the derived knowledge in an intuitive manner. In this regard, the interface generation circuitry 314 includes processing circuitry, such as the processor 302, to format the derived knowledge and to produce an accompanying interface. An example interface as may be generated by the interface generation circuitry 314 is described further below with respect to FIGS. 7-8.

In some embodiments, the interface generation circuitry 314 generates the entire interface for transmission to a client, such as an authoring tool. In other embodiments, the interface generation circuitry 314 may generate a data structure that includes data defining the interface (e.g., a HTML document, XML file, or JSON object describing the elements of the interface) which is parsed by the client and used to generate the interface. For example, the interface generation circuitry 314 may generate a data structure that is parsed by a knowledge display interface (e.g., the knowledge display interface 116 of FIG. 1) to generate the interface on the client.

Example of an Embodiment of a Context Analysis Component

Figure 4:
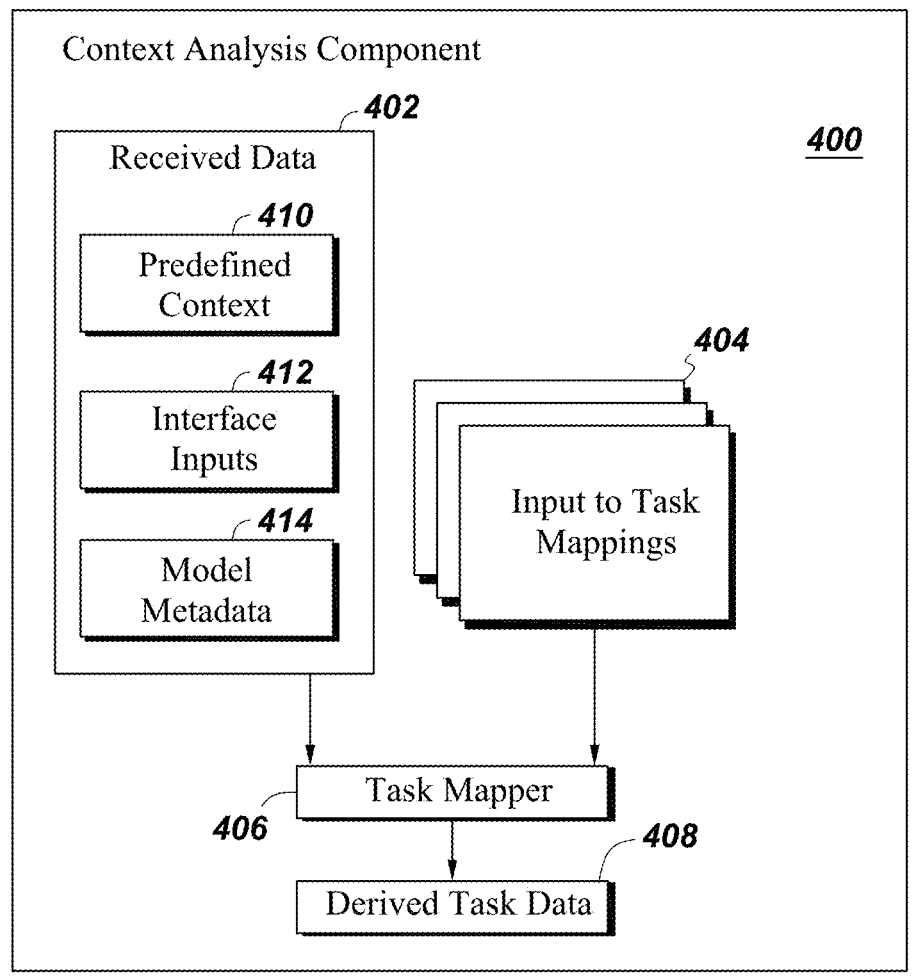
FIG. 4 depicts a detailed view of logical components of a context analysis component in accordance with some embodiments.

FIG. 4 illustrates a context analysis component 400, such as the context analysis component 118 described above with respect to FIG. 1. The context analysis component 400 may be implemented, for example, by contextual analysis circuitry 310 as described above with respect to FIG. 3. The context analysis component 400 captures received context data 402 provided by instrumentation within and/or logs provided by an authoring tool. The received context data 402 is used in conjunction with a set of predetermined task mappings 404 to derive particular modeling task data 408

(e.g., modeling tasks and modeling task attributes) related to a modeling operation performed using the authoring tool.

The received context data 402 may include a predefined context 410, interface inputs 412 (e.g., log data), and/or model metadata 414. The predefined context 402 refers to known or suspected model operation or activity that is being performed by a user of an authoring tool. The predefined context 410 may be determined, for example, by the user selecting a particular task from a series of menus (e.g., first selecting a "create new model" option, then selecting an "aircraft engine" model type, then selecting "serial number XYZ-123" from a series of hierarchical menus), entering data into a Tillable form, or the like. In some embodiments, the predefined context may be offered at various levels of granularity. For example, rather than selecting a broad task such as, "create new model," the user may select a particular element of the modeling operation such as, "ingest and clean data," "select machine learning technique for training set," or "select analytic to be applied to data." In some embodiments, the predefined context 410 may be inferred by the context analysis component 400 or the authoring tool that provided the received context data. For example, embodiments may evaluate the similarity of a given set of context data to previously received context data and infer the context by comparison.

The received context data 402 may also include a series of interface inputs 412. These interface inputs 412 may be generated by logs or instrumentation within the authoring tool to indicate the particular interface controls, menus, screen coordinates, keystrokes, or other inputs accessed during a modeling operation. The particular interface inputs 412 serve to provide a log of the user's interactions with the authoring tool during a given modeling operation.

The received context data 402 may also include model metadata 414 associated with a particular model created by a modeling operation associated with the received context data 402. This model metadata 414 may include, for example, the asset modeled in the modeling operation, the user who created the model, a user who edited the model, the analytic used in the model, any training data sets used to create the model, any subcomponent models employed in the model, a title of the model, data features that serve as inputs to the model, or the like.

A task mapper 406 maps the received context data to a set of input to task mappings 404. The set of input to task mappings 404 may include a set of rules for translating particular input operations performed using an authoring tool to a known ontology for representing modeling tasks and their associated task attributes. The input to task mappings 404 may include different rules depending upon the particular predefined context 410 indicated within the received context data 402. For example, two different predefined contexts 410 may result in different task attributes even with the same or similar input data. In one embodiment, the user may wish to clean a variable by filtering out values outside some user-defined minimum and maximum thresholds. The system may infer that certain sensors of the same type (e.g., temperature sensors) may have different typical min/max value ranges, depending on the context of where those sensors are located on the asset being modeled. For example, ambient room temperature sensors may have one set of min/max ranges whilst combustion temperature sensors will have different (and dramatically higher max, in particular) min/max ranges.

In some embodiments, the mapping process may be performed through a translation process that is aware of the format of the received context data 402 (e.g., where log data is provided in a predefined, standardized format). In other embodiments, alternative mapping techniques may be employed, such as through natural language processing (e.g., where logs are provided in unstructured English or other languages).

The output of the task mapper 406 may be provided as a set of derived task data 408 which represents data extracted from the received context data. The derived task data 408 represents structured information captured into a machine-readable format, such as Web Ontology Language (OWL). Capturing data in such a format advantageously provides a simplified interface for knowledge extraction and use in future operations. For example, the derived task data 408 may be used to generate a knowledge graph as part of a knowledge derivation process. An example of such a knowledge graph is described further below with respect to FIGS. 7-8C. In some embodiments, the derived task data 408 may be employed to automatically generate or suggest elements during future modeling operations sharing characteristics with previous modeling operations.

As one example of mapping inputs to tasks to create the derived task data 408, a set of context data may include log data indicating a sequence of events executed through the user interface, such as uploading a comma separated values (CSV) data file with a given file name, extension, size, and column headers, selection of a subset of the column headers as model inputs, filtering data via the elimination of values outside a range in a given column of the dataset, selection of a column header as the response (output) variable, selection of a modeling technique (e.g., regression), submitting a request to build the model, and a build 'task completed' event. Each such logged event may be accompanied by a variety of generic information such as a time stamp and user details (ID, browser type, etc), as well as action-specific parameters such as technique parameters (e.g., polynomial order), whether the model build task was successful or failed, and model statistics (e.g., various accuracy measures). The task mapper 406 may utilize this low-level interface interaction information to construct a structured representation of the model building task, identifying the subtasks of data preprocessing, model configuration, and build execution. These subtasks may capture the information relevant to each stage (e.g., what type of data was used, what classes of inputs and output were selected, what class of model it is, what parameters were used, what physical asset the model is associated with, the duration of the build task, and the modeling outcome). The structured information may be linked to other information in the knowledge graph (e.g., to other models of the same class, to information about the user, information about the associated asset, etc.).

In some embodiments, models and user activities that result in high accuracy, low error, low complexity, and low computational requirements may be deemed successful and ranked based on the prioritization of those criteria. Such determinations may be made by analyzing models in execution according to these and other metrics, and reconciling model performance against observed outcomes for a given asset.

More sophisticated causal graph analysis may also be employed to analyze different user activity paths to identify successful models. Summaries of similar models and past user activities may be displayed to the user, allowing them to drill into specific details. In such cases, only the most likely behaviors that are different from the user's current behaviors that are determined as likely to result in an improvement may be recommended.

Examples of Data Flow for Capturing Modeling Knowledge

Figure 5:
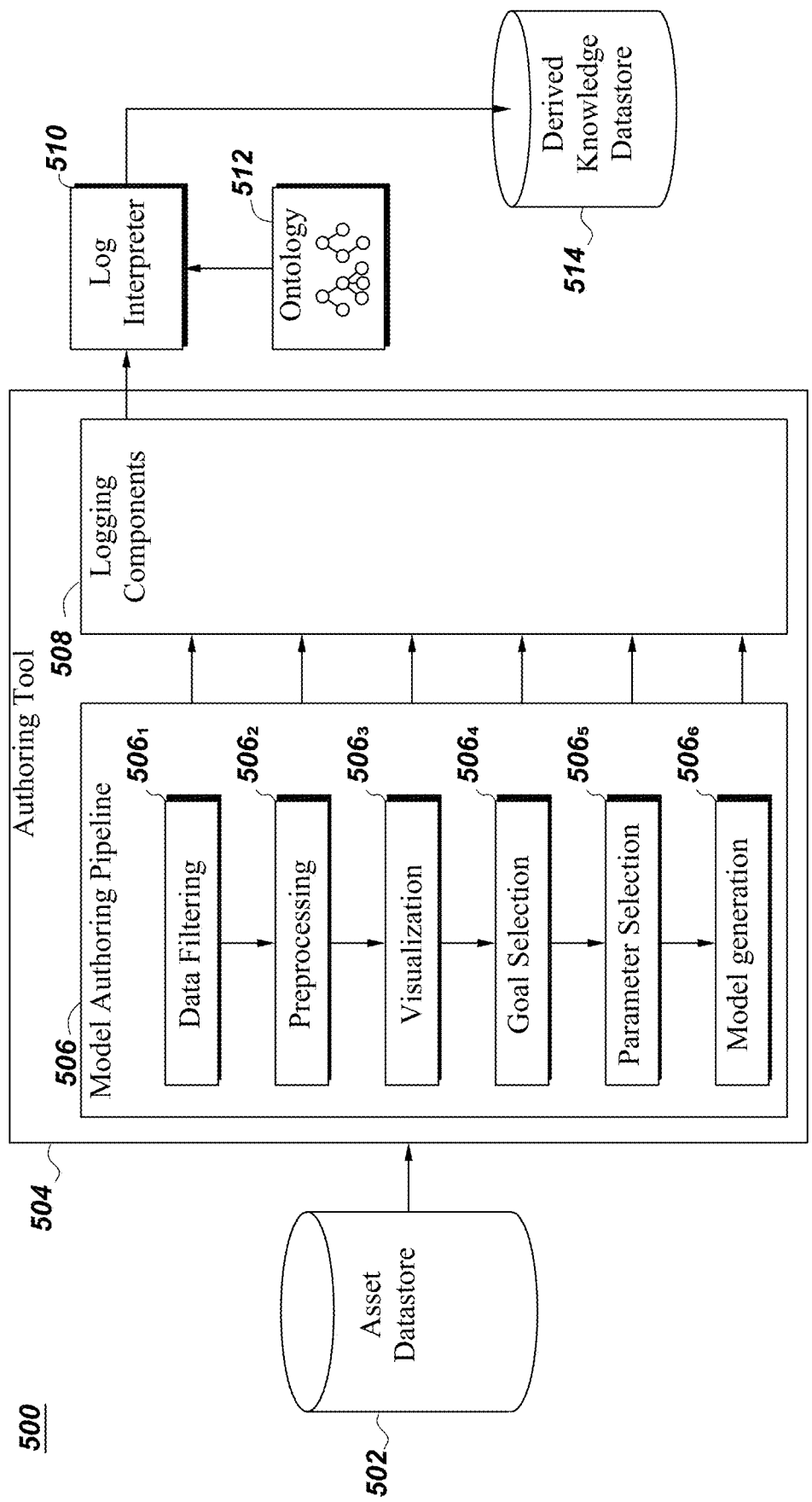
FIG. 5 depicts a detailed data flow diagram of a process for capturing knowledge during interactions with an authoring tool in accordance with some embodiments.

FIG. 5 depicts an illustration of an example of a data flow 500 for capturing modeling knowledge in accordance with some embodiments. The data flow 500 illustrates interactions between an asset datastore 502, an authoring tool 504, and a log interpreter 510 for the purpose of capturing modeling knowledge in a derived knowledge datastore 514. The asset datastore 502 may include a variety of sources of data related to industrial assets, executing predictive models, and the like. Such data may include asset metadata such as physical location and configuration, measurements from sensors affixed to assets, the operational status of executing predictive models, outcomes predicted by those predictive models, outcomes measured by the sensors affixed to the assets, and the like. The authoring tool 504 may access this asset datastore 502 to facilitate modeling operations performed using the authoring tool 504.

The authoring tool 504 provides a mechanism for performing tasks related to a model authoring pipeline 506. The model authoring pipeline 506 as represented in FIG. 5 illustrates some examples of interactions with the authoring tool when defining a predictive model. For example, a data filtering action $506_1$ allows the user to specify any data filtering techniques to be applied to the asset data used by a newly authored model, a preprocessing action $506_2$ allows the user to specify preprocessing techniques to be applied to the filtered data, a visualization action $506_3$ allows the user to specify visualization techniques applied to the preprocessed data, a goal selection action $506_4$ allows the user to select an objective to be modeled by the predictive model, a parameter selection action $506_5$ allows the user to select and tune particular modeling methods, kernel selection, coefficients, and the like for the predictive model, and a model generation action $506_6$ allows the user to finalize and generate the predictive model. It should be appreciated that these tasks are not an exhaustive list, and that the authoring tool 504 may implement additional or alternative tasks as part of a model authoring pipeline 506.

During each task of the model authoring pipeline, a logging component 508 may track user inputs and interactions with the authoring tool 504. These inputs may be stored as context data as described above with respect to FIGS. 1-4. The logging component 508 may provide this context data to a log interpreter 510, which may be included within the authoring tool 504 or as part of a separate process or application. The log interpreter 510 may map the data provided by the logging component 508 to an ontology 512. The ontology 512 provides a set of relationships between different types of interactions during modeling operations. To this end, the ontology 512 may be a hierarchical representation of various possible modeling operations, tasks of those modeling operations, relationships to particular types of models, modeling techniques, and the like. As noted above, the ontology may be provided using OWL or another mechanism for defining semantic relationships between data sets.

The log interpreter 510 maps the received log data to elements of the ontology, such as via the process described above with respect to FIG. 4. The mapped log data is stored within a derived knowledge datastore 514 as a set of derived modeling knowledge. In this manner, the ontology 512 may provide a schema for accessing and interpreting the data stored within the derived modeling knowledge 514. The derived knowledge datastore 514 may be implemented, for example, as a Resource Description Framework (RDF) database. It should be appreciated that the derived knowledge store 514 and ontology 512 may be implemented according to various technologies. For example, the derived knowledge store 514 may be organized as a semantic triple store that allows for retrieval of data via semantic queries, and the database schema for such a database may be the ontology 512 or another form of semantic model.

Examples of Data Flow for Providing Modeling Knowledge

Figure 6:
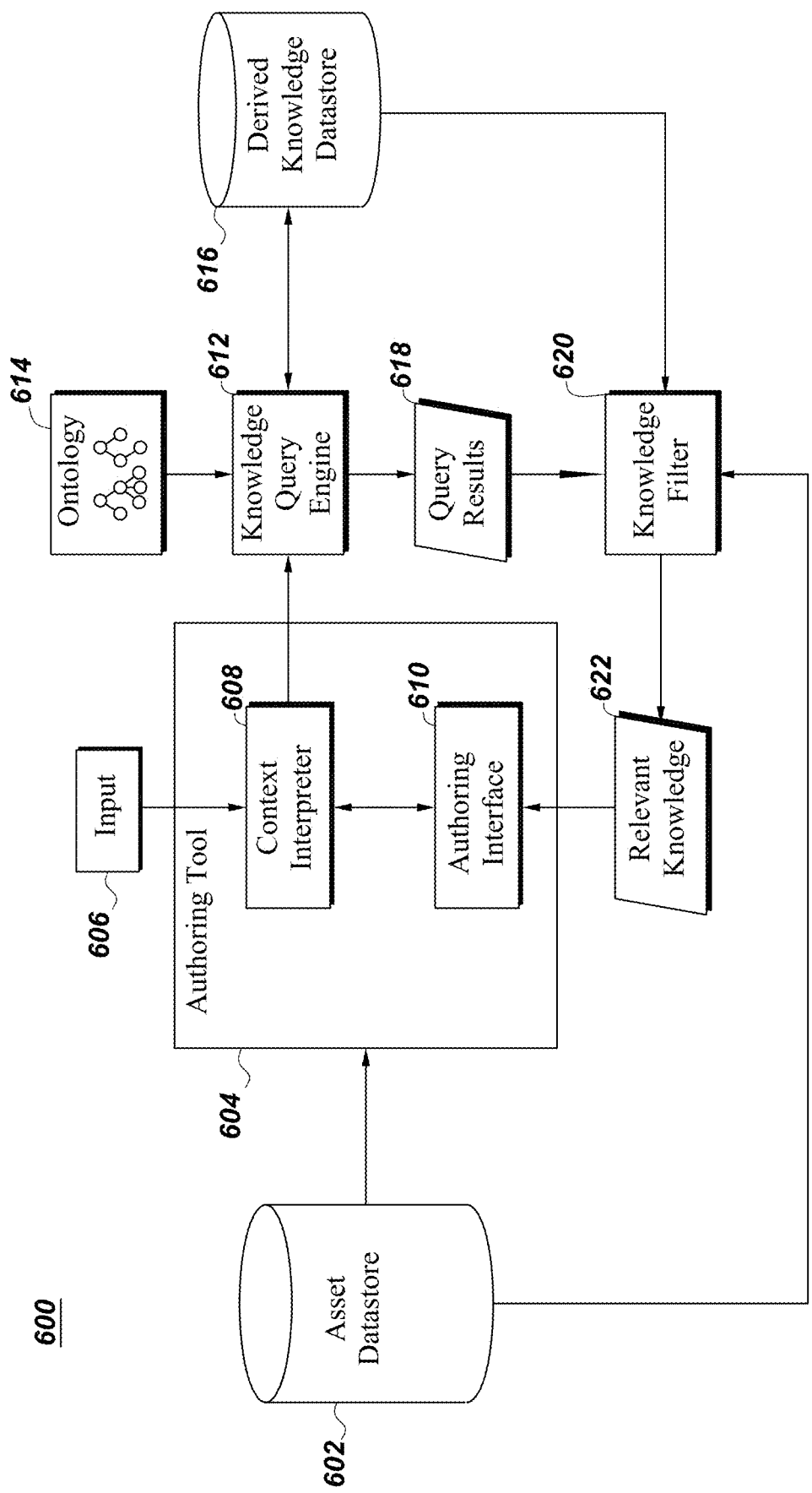
FIG. 6 depicts a detailed data flow diagram of a process for providing knowledge during interactions with an authoring tool in accordance with some embodiments.

FIG. 6 depicts an illustration of an example of a data flow 600 for providing modeling knowledge in accordance with some embodiments. The data flow 600 illustrates interactions between an asset datastore 602, an authoring tool 604, a knowledge query engine 612, and a knowledge filter 620 to provide relevant modeling knowledge 622 via an authoring interface 610. Such a system may be employed to provide relevant modeling knowledge to a user of a model authoring tool 604 by analyzing a set of derived knowledge 616, such as derived modeling knowledge captured by a process such as described further above with respect to FIGS. 1-5 and below with respect to FIGS. 7-12. This modeling knowledge may include, e.g., insights on what modeling techniques are most effective to produce high quality models for a specific problem, or what model parameters are good starting points from which to train a model, to name a few.

The data flow 600 includes a set of asset data stored within an asset datastore 602. The asset datastore 602 may be implemented similarly to the asset datastore 502 described above with respect to FIG. 5, and for the sake of brevity this description will not be repeated. The authoring tool 604 may be an authoring tool similar in structure and functionality as described above with respect to FIGS. 1 and 5.

The authoring tool 604 is operable to receive input 606. The input 606 may be user input via a GUI, or the input 606 may be an interaction with another external system (e.g., a remote client or asset management system). The input 606 includes some form of interaction related to a modeling operation as described above. For example, in some embodiments the input 606 is a text string or set of characters input via a text interface. In other embodiments, the input is a series of interactions with menus or other interface controls. In yet further embodiments the input 606 may represent a call to an API function or an inferred modeling task derived from a modeling orchestration component (e.g., a request to generate a new predictive model).

The input 606 is received by a context interpreter 608. Some or all of the context interpreter 608 functionality may be implemented by a context tracking component 112 and/or context analysis component 118 as described above with respect to FIG. 1. The context interpreter 608 may serve to both translate input into a format suitable for interaction with an authoring interface 610, and to also translate the input into an element of an ontology 614. This translation may occur, for instance, by performing natural language processing or other analysis of an input string, identifying particular user interactions with the authoring tool to identify modeling tasks, or the like. For example, the user may enter a string term "Scrap" into a field of a form. The context interpreter 608 may determine that the user has begun a new modeling task based on selection of a "new model" control, and map the term "scrap" to a "goal" element of the ontology for a "new model build" operation. The term and the identified element of the ontology may be sent to a knowledge query engine 612 for processing.

The ontology 614 may be organized such that elements of the ontology 614 refer to operations, objects, tasks, or the like related to modeling operations. For example, the ontology 614 may be defined as a hierarchical tree structure with nodes related to particular elements and edges defining relationships between those elements. Example elements may include, for instance, modeling operations (e.g., nodes for building a model, saving a model, editing a model), elements of a model authoring pipeline (e.g., defining data filtering operations, data preprocessing operations, goal selection operations), asset types (e.g., aircraft engine, power plant turbine), asset subtypes (e.g., aircraft engine model XYZ, gas turbine, wind turbine), modeling techniques, and the like. As a particular example, a parent node of the tree structure may be associated to a particular modeling task (e.g., a build new model node), and child nodes may include particular attributes of that task (e.g., an asset type node, a node for each step of a model authoring pipeline, or the like). Edges between those nodes may define the relationship, such that a "build new model" task "has" an "asset type" associated, "needs" each required element of the model authoring pipeline, "may have" each optional element of the model authoring pipeline (e.g., where a data filtering step is optional), and the like. Each of those child nodes may have further associated child nodes with similar defined relationships (e.g., a preprocessing node may have sub attributes for the particular preprocessing technique used, the source of ingested data, and the data output format).

It should be appreciated that while the ontology describes the structure of possible operations (e.g., a model build operation requires an asset type, a model type, an outcome, and data features), rather than the actual values of the particular attributes. The edges between nodes define the relationships between nodes, such as whether a modeling operation has certain steps or sub-steps, uses particular modeling techniques, has an "asset type" field, or the like.

The knowledge query engine 612 may utilize the identified element of the ontology and the related value to initiate a query against a set of derived knowledge 616. The set of derived knowledge 616 may be organized by the ontology 614 such that the ontology 614 serves as a schema for a database storing the derived knowledge. In this manner, the identified element of the ontology and related value (e.g., "new model build" and "scrap" as specified above) may be used to execute a query against the set of derived knowledge. The query may identify a set of relevant records from the set of derived knowledge as a set of query results 618.

The query results 618 may include every data record that is associated with the element of the ontology and related value as provided to the knowledge query engine 612. However, the query results 618 may include a number of records that are not appropriate for the particular action being performed using the authoring tool. For example, the query results 618 may include records related to various modeling operations that were inefficient or resulted in inaccurate data or inaccurate predictive models. The use of a knowledge filter 620 provides a mechanism for improved results to be provided to the authoring tool 604. In this manner, the knowledge filter 620 may perform a downselection on the set of query results 618 to select the particular query results most relevant to the modeling operation being performed using the authoring tool 604.

In some embodiments, the query results 618 include identifiers, serial numbers, or part numbers for the particular model generated by the operation or an asset identifier for an asset associated with the model. These identifiers may be used to perform queries against the asset datastore 602 by the knowledge filter.

In this regard, the knowledge filter 620 may access the asset datastore 602 to obtain information about the predictive models identified in the query results 618. This information may include, for example, the performance of these predictive models in execution, including error rates, false-positive rates, or other data related to the accuracy of the predictive models. For example, the asset datastore 602 may include unique identifiers for particular predictive models, and the knowledge filter 620 may use unique identifiers included in the query results to query the asset datastore 602 for performance data for those models. The performance data may then be used to filter the set of query results 618 to only those for models with certain performance characteristics (e.g., accuracy greater than a threshold value, error rate below a threshold value, false positive rate below a threshold value, or the like).

The knowledge filter 620 may also filter the query results 618 by alternative mechanisms, such as by identifying particular modeling parameters employed in at least a threshold number of modeling operations identified in the query results (e.g., 50% of aircraft engine modelers have employed this particular modeling technique), or identifying outliers (e.g., this modeler used an entirely unique combination of data ingestion and preprocessing techniques). In some circumstances, the knowledge filter may perform further analysis and processing, such as by identifying correlations between certain modeling parameters and accuracy (e.g., models created using a particular modeling technique appear to have a lower error rate), which are used to highlight particular records or sets of knowledge when generating a set of relevant knowledge 622 for forwarding to the authoring interface 610.

The relevant knowledge 622 may be a list of data records, knowledge graph, or data used to generate a visualization interface for reviewing the relevant modeling knowledge related to the original identified context data. Alternatively, in some embodiments the relevant knowledge 622 may include a set of initial set points, model parameters, or interface selections to be used by the authoring interface 610 for the purpose of automatically suggesting a set of actions as part of a modeling operation. For example, in some scenarios the relevant knowledge may suggest the most frequently used sets of parameters as initial values for a modeling operation. In other scenarios, the relevant knowledge 622 may include modeling parameters synthesized from multiple different modeling operations identified in the query results, such that the recommended input parameters are determined across a variety of modeling operations, rather than a mere "most frequently selected" analysis. Such parameter synthesis may be performed through the use of model performance data obtained from the asset datastore 602, such that correlations between particular modeling techniques and model performance may be identified by the knowledge filter and used to generate the relevant knowledge.

The relevant knowledge 622 includes a set of processed records of the query results that are most relevant to the original context data identified by the context interpreter 608. The relevant knowledge 622 is forwarded to the authoring interface 610. In some embodiments, the authoring interface 610 includes one or more interface controls for visualizing the relevant knowledge (see, e.g., the examples of interfaces described below with respect to FIGS. 7-8C). Additionally or alternatively, the authoring interface 610 may use the relevant knowledge to prepopulate one or more fields of an interface for defining a model or set of model parameters.

Examples of Interfaces for Capturing and Displaying Modeling Knowledge

Figure 7:
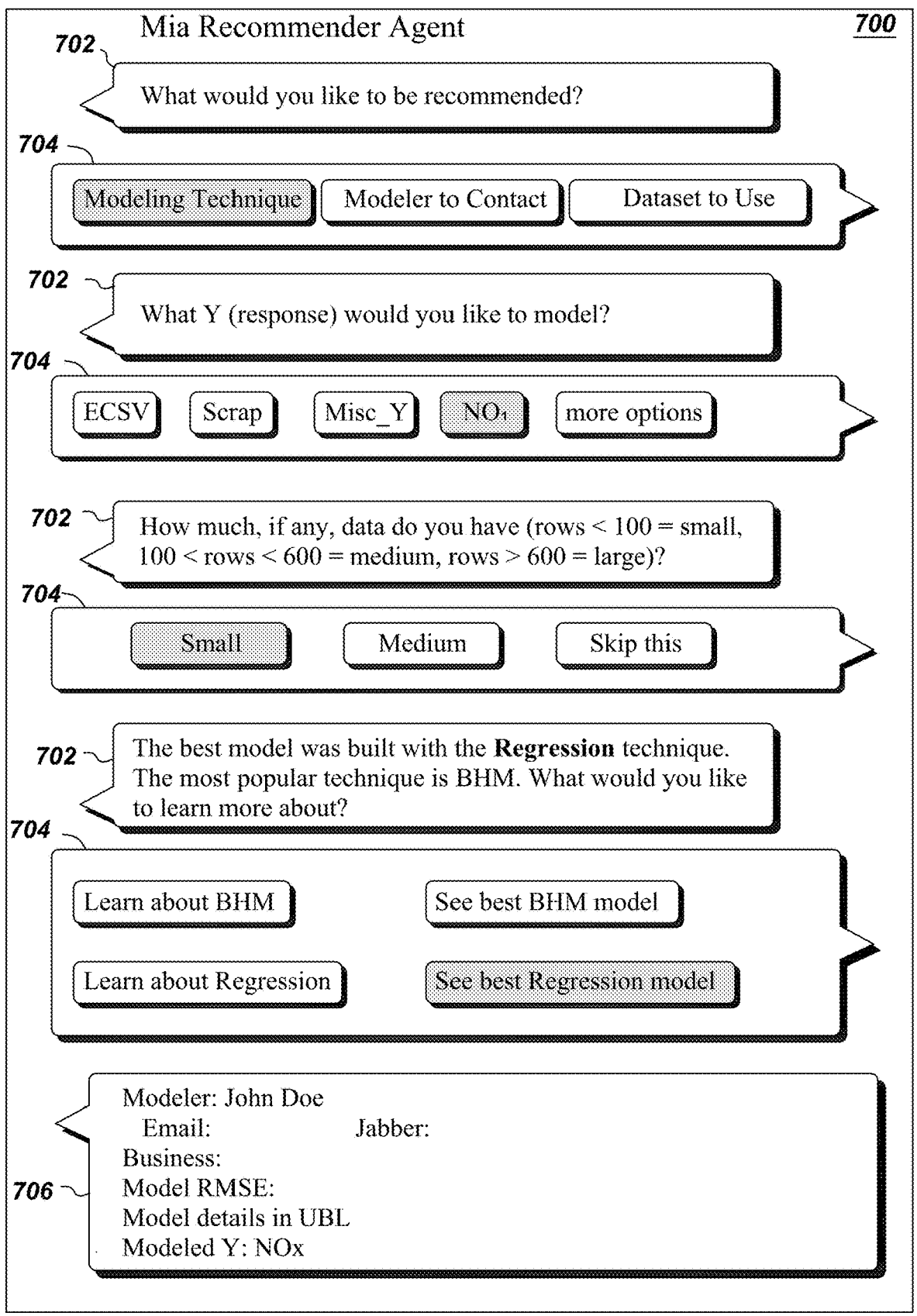
FIG. 7 depicts an illustration of a predictive model conversational knowledge agent interface in accordance with some embodiments.

FIG. 7 depicts an illustration of an interface 700 for viewing derived modeling knowledge in accordance with some embodiments. The interface 700 illustrates a mechanism by which a model author may visualize derived knowledge to assist with a modeling operation. The interface 700 depicts an interface control that provides access to derived modeling knowledge via a text interface. The interface 700 includes a series of queries 702 posed to the user and interface controls 704 for responding to the queries. By analyzing the user's responses to the queries 702 via the interface controls 704, embodiments may select particular relevant knowledge to be provided to the user. Based on the responses provided via the interface controls 704, a result 706 is provided which, in this case indicates a particular type of regression model relevant to the answers the user provided via the interface controls 704.

Figure 8A:
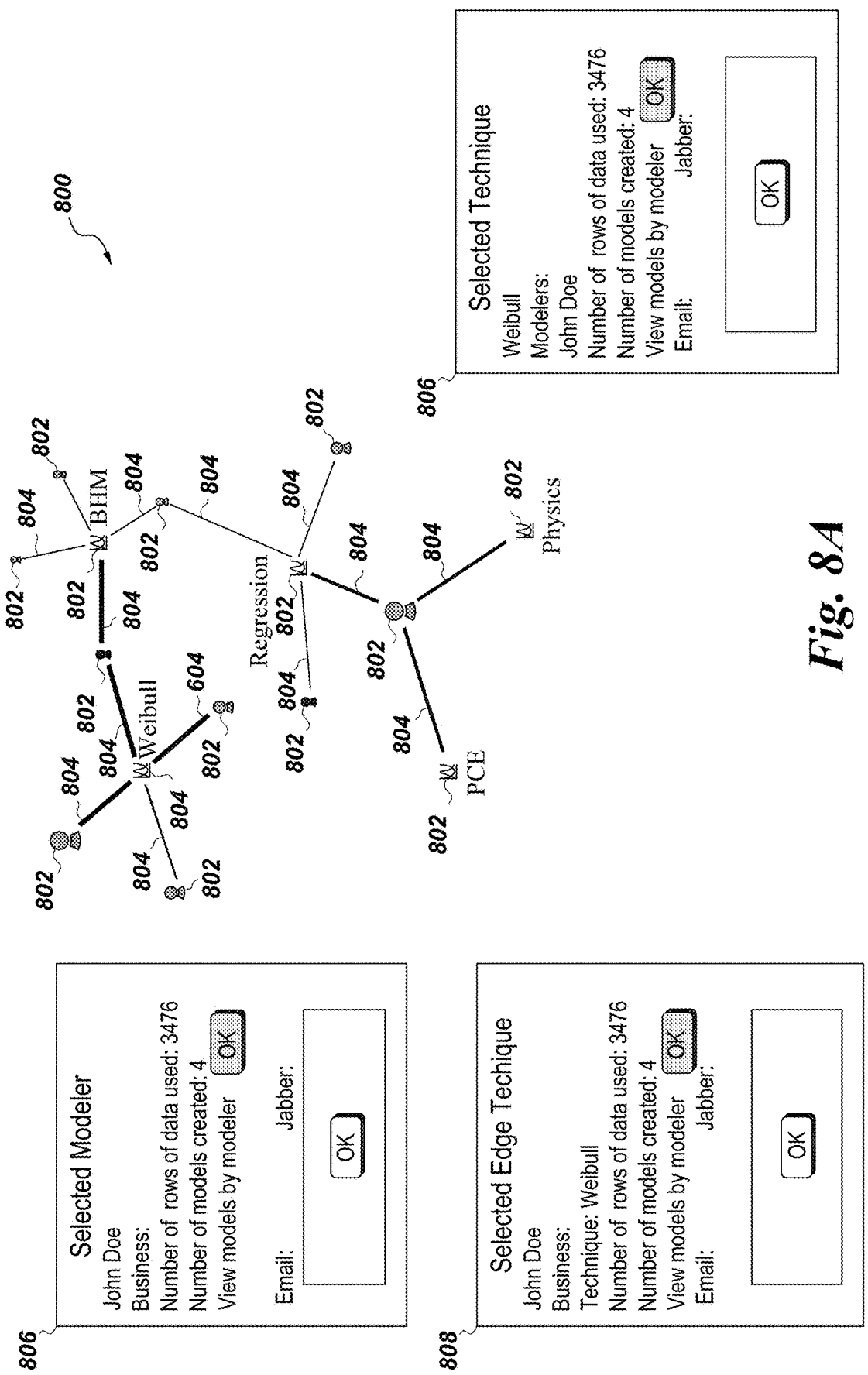
FIGS. 8A-8C depict illustrations of an example of a knowledge graph interface for displaying knowledge derived from modeling operations in accordance with some embodiments.
Figure 8B:
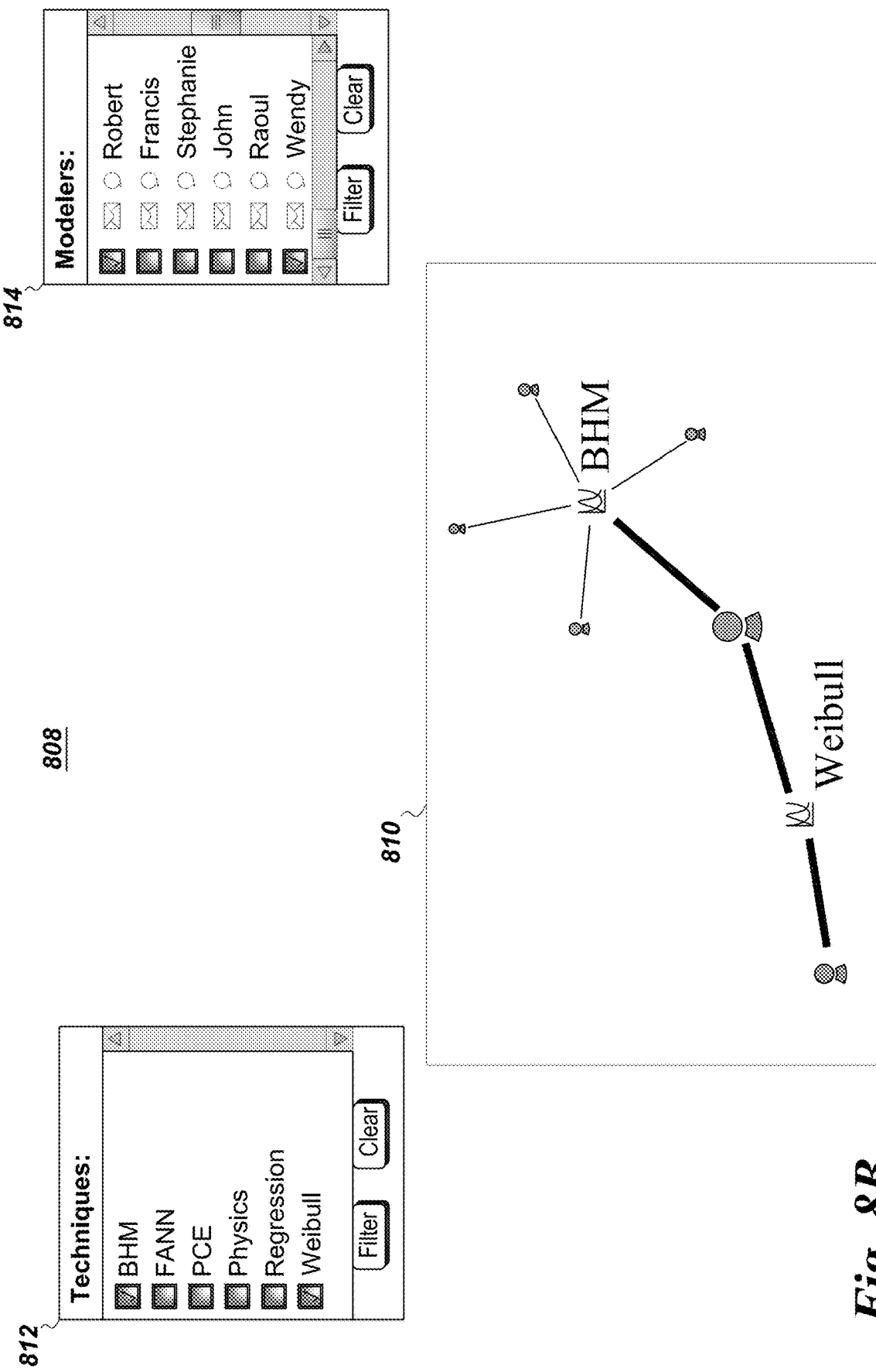
Figure 8C:
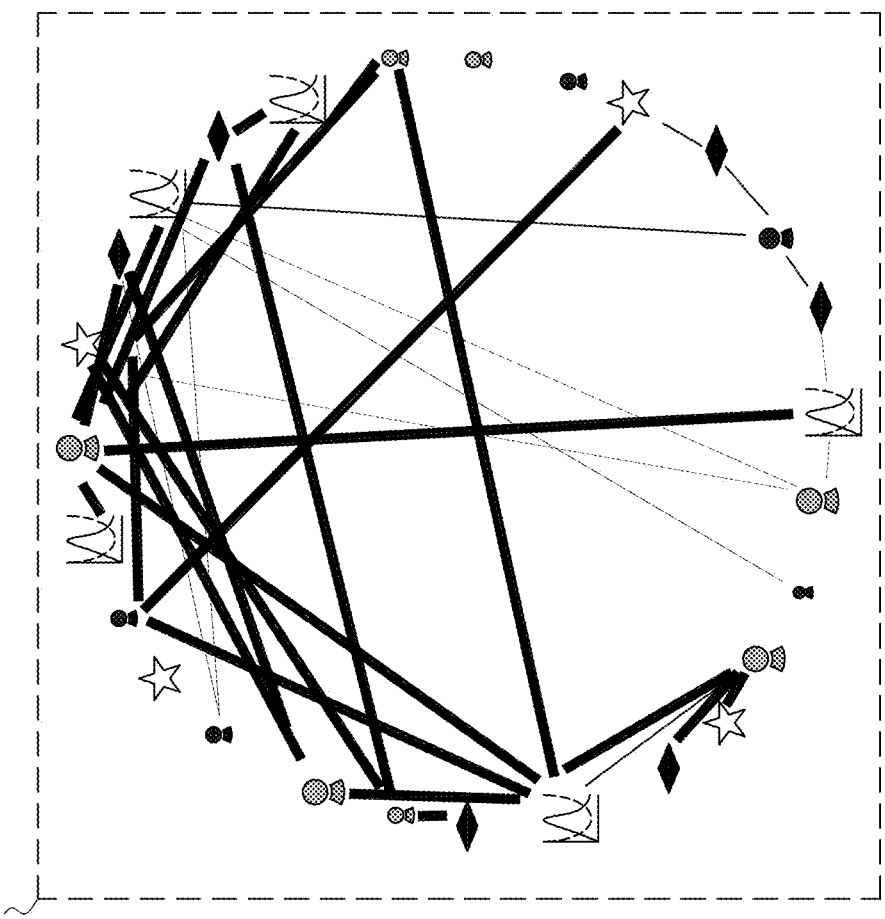
Figure 8C:
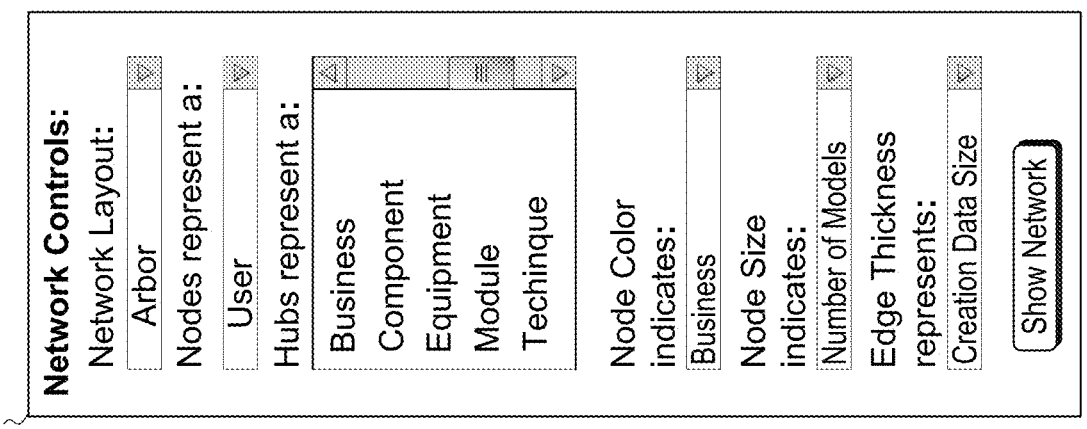

FIGS. 8A-8C. depict illustrations of interfaces for visualizing a detailed knowledge graph of derived modeling information. These interfaces allow for visualizing various elements of derived knowledge. For example, the interfaces depict a knowledge graph whereby derived modeling knowledge may be displayed via a hub-and-spoke structure. Some embodiments of such a knowledge graph may be developed or generated using open source tools, such as the open source visualization library Cytoscape.js. For example, users may be represented by icons which are connected to hubs that represent various model parameters (e.g., modeling techniques, asset types, organizational affiliations, model goals). The interfaces may be dynamically reconfigurable based on a set of interface controls that allow a user to specify the type(s) of information to be visualized. In response, spokes of the hub-and-spoke model may be dynamically redrawn based on the type of data the user wishes to visualize. For example, a user may select an icon related to a particular asset type and be presented with a menu representing different parameters for models associated with that asset type. Upon selection of a particular parameter (e.g., analytic type), the interfaces may adjust to display spokes from the asset type to different analytic types, with the thickness of respective spokes representing the frequency with which that analytic type was employed for the selected asset type.

Selecting a particular element within the interfaces may also provide additional information about the selected element. For example, selecting an element corresponding to a user may provide an interface control displaying the number of models created by the user, with which organization the user is associated, how much data has been uploaded by assets associated with the user or to models authored by the user, or the like. Some embodiments may also provide user contact information, such as an email address of instant message identifier. Other interface controls may provide additional information about their corresponding model parameter. For example, selecting a control associated with an analytic type may include counts of the number of models associated with that analytic type, model goals typically solved by that analytic type, model counts displayed by underlying organization, or a link to a knowledge community (e.g., forum, listserv, or the like) associated with the analytic type. It should be readily appreciated that any elements of the derived modeling data as described herein may be employed to generate the interfaces.

As a particular example, FIG. 8A depicts an illustration of an example of an interface 800 utilizing a knowledge graph comprising a hub-and-spoke model as described herein. In the interface 800, hubs 802 of the knowledge graph correspond to particular users and modeling techniques, while spokes 804 between the hub illustrate the relationship between the items represented by the hub. Selecting of particular hubs 802 or spokes 804 may generate interfaces 806 that provide additional derived knowledge related to the selected item. For example, selecting a hub for a modeling technique may generate an interface including knowledge indicating the number of times the modeling technique was employed, modelers that have used that modeling technique, the number of rows of data used by models using that technique, and the like. The interfaces 806 may also include additional interface controls that allow for further interactions, such as generating a message to a user associated with the selected item, viewing models using the particular modeling technique, or the like. In some embodiments, the particular interfaces 806 generated may be informed not only by the selected element of the knowledge graph, but also by context data related to the user or modeling operation being performed by a user of the authoring tool.

FIG. 8B depicts an illustration of an example of an interface 808 for configuring a knowledge graph 810. The interface 808 includes interface controls for filtering the components of the displayed knowledge graph 810. In this instance, the interface includes an interface control for selecting modeling techniques 812 and an interface control for selecting particular modelers 814. Checkboxes within the interface controls 812 and 814 allow the user to identify particular techniques and modelers to constrain the displayed portion of the knowledge graph. As selections are made, data associated with those selections is added to the knowledge graph. In this manner, embodiments provide mechanisms for filtering a displayed knowledge graph to particular subsets of derived modeling data. While the specific example describes filtering based on modeling techniques and modelers, various additional or alternative embodiments may also include capabilities for filtering based on user organization, amount of data processed by models, number of assets associated with that model, number of executing models associated with each model definition, or various other metrics or criteria stored within a set of derived modeling knowledge.

FIG. 8C depicts an illustration of an example of an interface 816 for configuring a knowledge graph display 820 in accordance with some embodiments. The interface 816 includes a control panel 818 for configuring the knowledge graph display 820. As illustrated, the control panel 818 includes individual controls for selecting a network layout, nodes, hubs, edge thicknesses, node size, and the like for visualizing different elements of derived knowledge within the knowledge graph display 820. For example, the control panel 818 allows a user to reconfigure the edge thickness of connections between hubs and nodes to represent different types of data, to reconfigure the relative size of the nodes to represent different data types, and the like.

Examples of Processes for Implementing Modeling Knowledge Capture Systems

Figure 9:
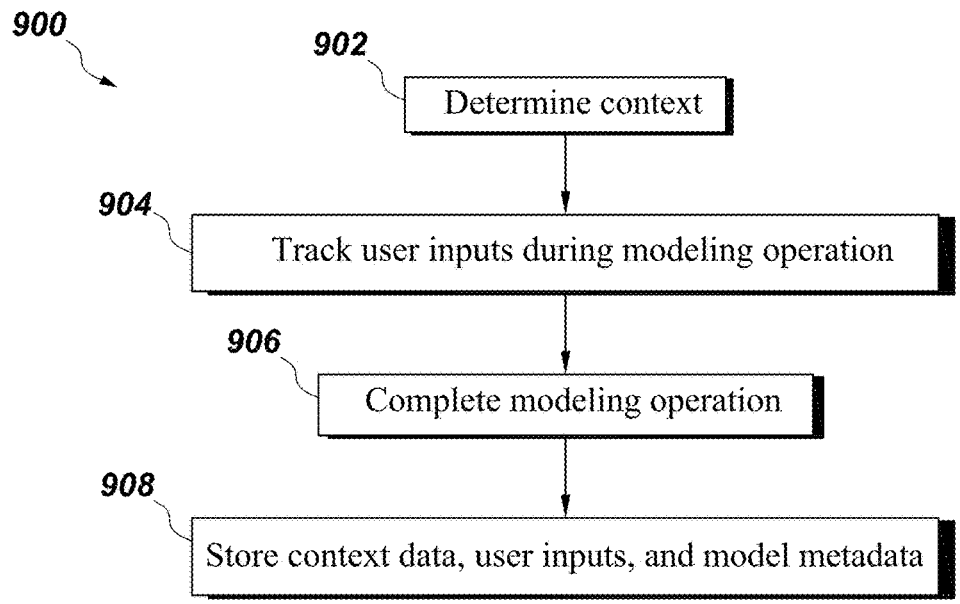
FIG. 9 depicts a flow diagram illustrating a process for capturing interactions during a predictive model authoring process in accordance with some embodiments.

FIG. 9 illustrates an example of a process 900 for capturing context data during a modeling operation in accordance with embodiments of the present invention. The process 900 may be implemented by an authoring tool, such as the authoring tool 102 described above with respect to FIG. 1. The process 900 illustrates a mechanism by which inputs to the modeling tool are tracked during a modeling operation, the authoring tool facilitates execution of the model, and relevant context data and model metadata is stored and/or transmitted for use in a knowledge derivation process.

At action 902, a context is determined for the modeling operation being performed using the authoring tool. The context may be determined by the user explicitly specifying the particular intended modeling operation. In different embodiments, the intended modeling operation may be provided at different levels of granularity. For example, in some embodiments the user may specify only a high-level modeling operation (e.g., defining a new model, editing an existing model), while in other embodiments the user may specify various attributes of the modeling operation (e.g., defining a new model for an aircraft engine, copying an existing model, editing an existing model to define a new model for an asset of the same type). The determined context may be determined implicitly (e.g., derived from other user interactions with the authoring tool) or explicitly (e.g., a particular menu or input control provided for declaring the context). As described above with respect to FIG. 5, determination of the context may include identifying an element of an ontology associated with the modeling operation, such that captured inputs may be mapped to that element of the ontology for storage and analysis. It should also be appreciated that in some embodiments, the appropriate element of the ontology may be inferred from logs of input interactions, such that the identification of the appropriate ontological element occurs when logs are processed, rather than at the time the context data is received.

At action 904, user inputs are logged during the modeling operation. The user inputs may be stored in a log associated with the modeling operation. For example, in some embodiments selection or determination of the context at action 902 may initiate a new set of logs associated with that modeling operation, whereby the user inputs that occur during that modeling operation are saved to that set of logs. The logs may include raw user interactions with the authoring tool (e.g., mouse click events at particular x, y cursor coordinates and coordinates at which particular interface controls are located), logical interactions with particular controls (e.g., selection of "submit" control of a particular menu or selection of a particular element from a drop down menu), and/or logical interactions with respect to the modeling operation (e.g., selection of particular input data source, selection of particular analytic type, loading a particular model for editing).

At action 906, the modeling operation is completed. Completion of the modeling operation may include, for example, generating and storing a predictive model having parameters as defined with the authoring tool. Completion of the modeling operation may also include editing an existing model, linking a model to a new asset, or various other actions as implemented by the authoring system. In some embodiments, completion of the modeling operation triggers compilation of various libraries and code defined through the modeling parameters entered into the authoring tool. Upon compilation, the model may be uploaded to a model execution platform (e.g., the model execution platform 106 as described with respect to FIG. 1) to begin execution, ingestion of data, and output of results. Completion of the modeling operation may also result in modification or creation of metadata associated with the particular model or models upon which the modeling operation was performed. This metadata may indicate the various parameters of the model, the user that authored the model, the asset type associated with the model, or the like.

At action 908, the stored context data, user inputs, and model metadata are stored for analysis by a model development context analyzer, such as the model development context analyzer 104 described above with respect to FIG. 1. The storage of this data may be accomplished by storing in a local memory, transmitting to a remote computing node, storing in a shared database, or the like. Storage of this data may enable the use of the data in populating a set of derived knowledge, such as described above with respect to FIG. 5. By storing the context data, user inputs, and model metadata, these data elements are made available to the model development context analyzer for use in knowledge derivation operations. Example processes for performing these knowledge derivation operations are described further below with respect to FIGS. 10-12.

Figure 10:
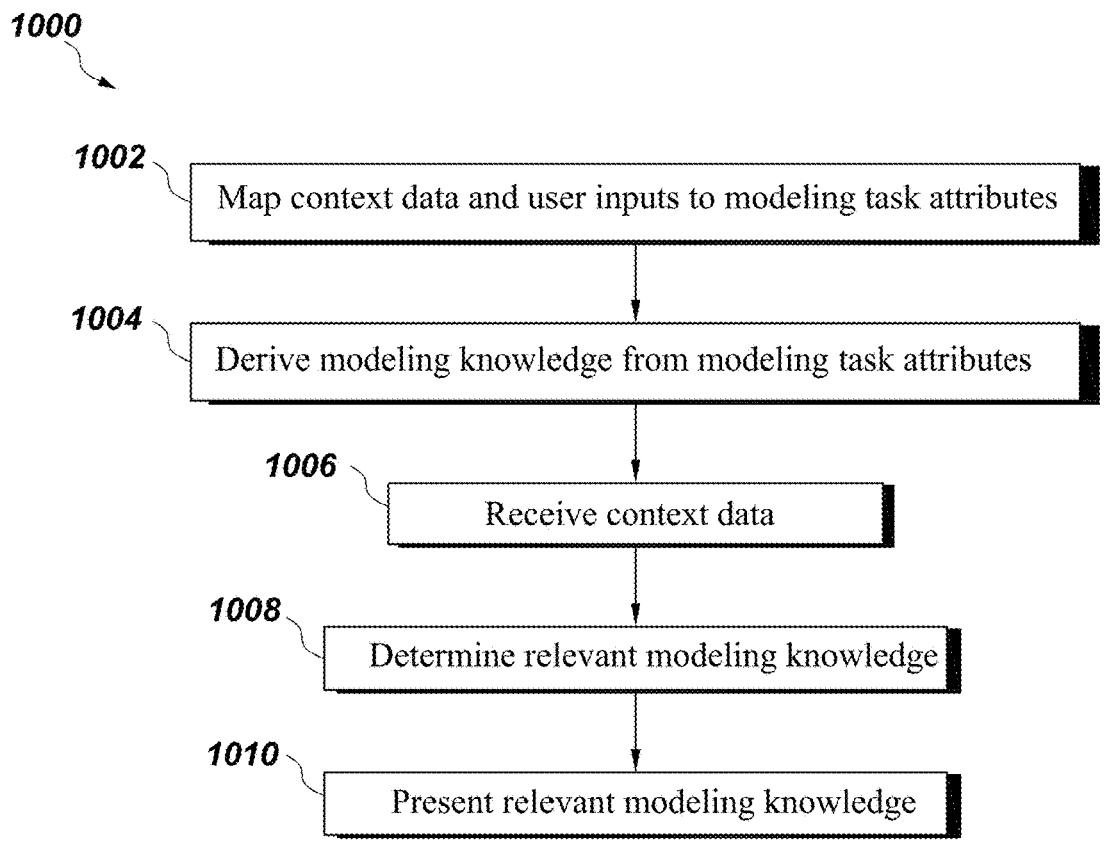
FIG. 10 depicts a flow diagram illustrating a process for deriving model authoring knowledge in accordance with some embodiments.

FIG. 10 depicts an example of a process 1000 for presenting derived knowledge for use in a modeling operation in accordance with embodiments of the present invention. The process 1000 illustrates a mechanism by which a user of an authoring tool may have parameters for a model automatically suggested or provided in response to initiating a modeling operation. The process 1000 may be performed, for example, by a model development context analyzer 104, such as described above with respect to FIG. 1.

In some embodiments, the user may interact with the knowledge in the knowledge graph via a user interface including an interactive dialog agent. The agent may pose specific questions to the user to understand their high-level goals, and then based on the answer(s) the agent determines the next most relevant question to pose. This is determined by exploring all possible subsets of the knowledge graph that align to the user's answers to the previous questions (e.g., identifying information related to the particular asset being modeled, the amount of data available to the user, or the like), and then calculating the information gain associated with all of the remaining fields in the knowledge graph. The agent may then determine which field or attribute has the highest information gain, meaning it will be the most useful field on which to split the remaining subset of the data in the graph. Thus, the agent may then ask the question associated with that field or attribute, to further minimize the size of the knowledge graph, narrowing it down to a few specific pieces of knowledge that can be conveyed to the user at the end of the interactive question-answer dialog, since that is the knowledge that aligns with the user's answers.

The process 1000 begins at action 1002 where model context data and user inputs are mapped to a particular set of modeling tasks and associated task attributes. A detailed example of such a process is described further below with respect to FIG. 11. By this process, a given set of user inputs may be mapped to particular element of an ontology relating to derived knowledge from sets of modeling operations, such that the user inputs are employed to identify elements of the ontology and attribute values associated with those elements of the ontology associated with particular tasks, sub-tasks, and model parameters performed during that modeling operation. The process of mapping the context data and user inputs to tasks and task attributes may be performed via a context analysis component or context interpreter such as described above with respect to FIGS. 4-6.

At action 1004, modeling knowledge is derived from the identified modeling tasks and task attributes. The modeling knowledge is derived by examining a corpus of task information (e.g., the derived knowledge 616 described above with respect to FIG. 6) performed over a variety of modeling operations and identifying particular model parameters and other information that are correlated with one another. Embodiments may index by various elements of the ontology, such that the ontology forms the schema for the datastore in which the derived knowledge is stored.

In some embodiments, the set of derived modeling knowledge may be further processed, filtered, or otherwise curated (see, e.g., the process 1200 described with respect to FIG. 12) such that particular model parameters are identified for further analysis based on a priori information. For example, a predefined analysis may link a given asset type and analytic type parameter, such that embodiments determine a set of frequencies with which each analytic type is employed for that asset type and present the set of frequencies as derived knowledge. In other embodiments, correlations may be dynamically determined without predefined notions of which model parameters may be interrelated. For example, embodiments may perform regression analyses on the task information to dynamically determine correlations between different tasks, model parameters, model metadata, and the like. Correlations in the knowledge graph may be identified using similarity scores between different objects and their attributes including the use of subclass inferencing to enable normalization across different data, analytics, assets, etc. In one embodiment, a similarity score may be calculated per-attribute by performing semantic similarity matching between text properties in different models, and by performing normalization to compare numeric fields, which result in scores in the range of 0 (completely different) to 1 (identical). These per-attribute similarity scores can be aggregated (e.g., sum, average, . . . ) to produce an overall similarity score between two models. Models that have a higher property overlap are deemed to be more similar. In other embodiments, other types of techniques could be used to identify correlations.

At action 1006, a set of context data associated with a new modeling operation is received. The set of context data may indicate various aspects of the modeling operation, including but not limited to the type of modeling operation, an asset type associated with the modeling operation, a particular user performing the modeling operation, a user organization, or the like. Alternatively, in some embodiments the context data may not explicitly be tied to a modeling operation, but may instead be provided in response to a user interaction with a set of knowledge. For example, a user may interact with a knowledge graph to select a particular node of the knowledge graph (see, e.g., the knowledge graph described above with respect to FIG. 8), and the context data may indicate the particular node, hub, spoke, or the like of the knowledge graph selected by the user.

At action 1008, relevant modeling knowledge is determined based on the received context data. The relevant modeling knowledge may include, for example, particular correlations in the derived modeling knowledge that include or reference model parameters, metadata, model type, or the like specified in the received context data. For example, if the received context data includes an asset type, the relevant modeling knowledge may include correlations between that asset type and other model parameters or metadata (e.g., analytic type, input features, other users who have modeled that asset type). Relevant knowledge is determined based on the user's current activities as compared to the current knowledge base.

Each action that the user performs may allow the system to identify a successively smaller subset of the knowledge base that is relevant to the user's current behaviors. For instance, from the current context data the process may determine that the user has uploaded a dataset for a particular asset, has performed a few operations on the dataset, and saved it. From there, the process may infer, based on the knowledge graph and the context data, that most likely the user will start executing steps to build a model. Given the current context data (asset type, dataset characteristics, etc.) the process may recommend next steps (e.g., selecting inputs and output, selecting a technique and parameters). As the user performs these actions, the additional context data may be used to further down-select the recommended next steps. For example, if the user selects 'Regression' as the modeling technique, then the next recommended steps will be targeted to the new context, including choosing regression-specific parameters such as the polynomial order. As the relevant knowledge base is narrowed, the system can make specific recommendations of likely next steps based on their current actions. In addition, the system can identify when the user's next actions are different based on the knowledge base and highlight those occurrences to the user. As the user continues to act within the system, the knowledge base is continuously updated with new information. In some embodiments, this process may be implemented by, for example, a knowledge filter 620 as described above with respect to FIG. 6, such that the knowledge filter 620 iteratively refines the set of relevant knowledge 622 as additional interactions occur via the authoring interface 610. An example of a process for implementing these operations is described further below with respect to FIG. 12.

At action 1010, the relevant modeling knowledge is presented. Presentation of the relevant modeling knowledge may include, for example, displaying the relevant modeling knowledge in an interface, such as a knowledge graph. In other embodiments, the relevant modeling knowledge may be transmitted to a remote computer (e.g., where the user is running a client device including a separate interface) for display, output, or other interactions.

Figure 11:
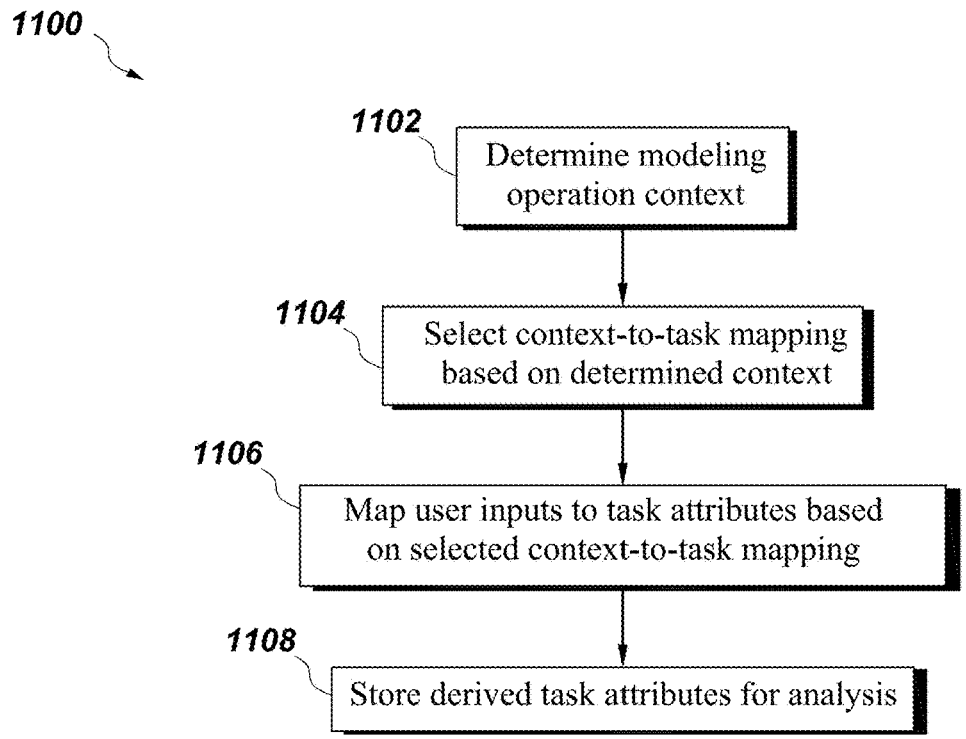
FIG. 11 depicts a flow diagram illustrating a process for mapping user inputs and context data to tasks in accordance with some embodiments.

FIG. 11 depicts an example of a process 1100 for deriving tasks from user inputs and context data in accordance with some embodiments. The process 1100 illustrates a mechanism by which context information (e.g., a received modeling operation context) is used to map a given set of user inputs to a set of tasks. In this manner, the context information controls the input mapping operation, such that two sets of the same or similar inputs may be mapped to different tasks based on the particular context information, even if those inputs are performed using the same or similar interface controls, web pages, or the like. The process 1100 may be performed, for example, by a model development context analyzer as described above with respect to FIG. 1.

At action 1102, a modeling operation context is determined. As noted above, the modeling operation context may define a particular modeling operation, such as creating a new model, editing an existing model, copying a model, linking a model to a particular asset, or the like. The modeling operation context may be determined implicitly (e.g., through monitoring user interactions with an authoring tool and inferring the modeling operation context) or explicitly (e.g., received via an interface control where the user selects a particular modeling operation context). The modeling operation context may also be determined by a separate computer or computing node than that of the node performing the process 1100. For example, an authoring tool may provide mechanisms for determining the modeling operation context and that modeling operation context may be transmitted to the computing node performing the process 1100.

At action 1104, a particular context-to-task mapping is selected based on the determined context. The process 1100 may include a set of configuration files or other data structures indicating a particular relationship between tasks of a modeling operation and particular user inputs. The particular data structure or file may be selected based on the determined context. For example, the user may select an existing model and upload a dataset with the same column headers as the dataset used to build the model, except the header used as output is not present in the new file. In this case, the context-to-task mapping would immediately determine that the user intends to run the model, not update it or rebuild it. Alternatively, the logs may show the user selecting an existing model, selecting an existing dataset, and selecting the same inputs and outputs, at which point the context may be mapped to a new build model task using a different technique or parameters. In another variation, after selecting the existing model and dataset, the user may eliminate a subset of the rows in the dataset, which may lead the context to be mapped into a model rebuild task.

At action 1106, the user inputs are mapped to particular tasks of the modeling operation based on the selected context-to-task mapping. These mapped tasks are then stored in memory for use in a modeling knowledge derivation operation at action 1108, such as the operations described herein with respect to FIGS. 6, 10, and 12. As described above, the mapped tasks may correspond to elements of an ontology which serves as a schema for a datastore in which the particular tasks are stored as a set of derived knowledge.

Figure 12:
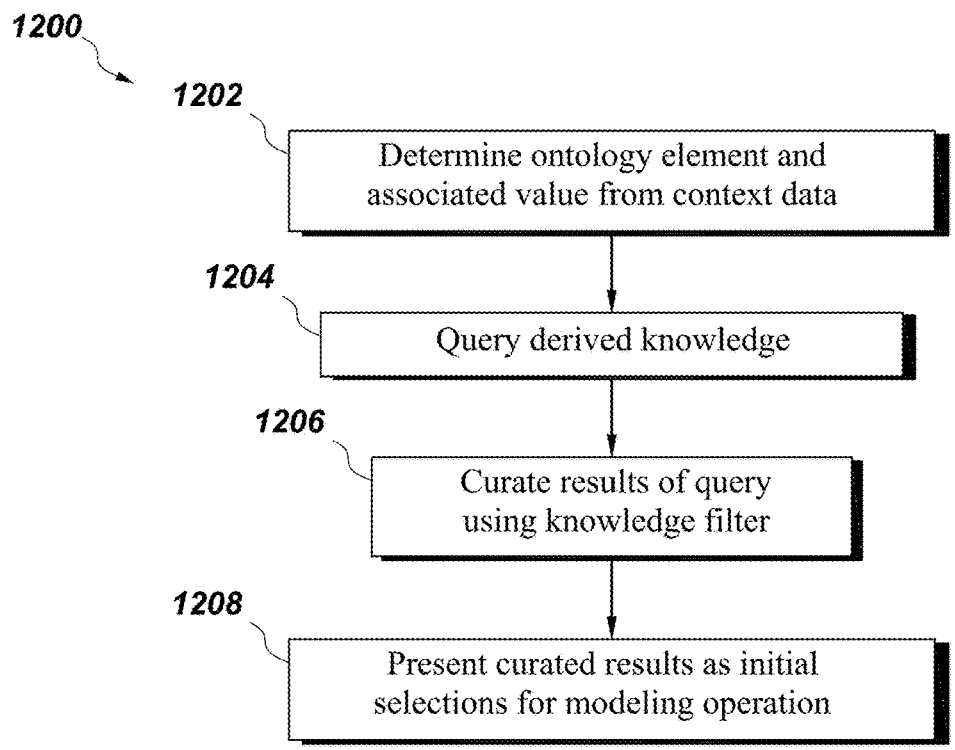
FIG. 12 depicts a flow diagram illustrating a process for determining model parameters based on derived model authoring knowledge in accordance with some embodiments.

FIG. 12 depicts an example of a process 1200 for determining a set of model parameters for use in a model authoring operation based on analysis of a set of derived modeling knowledge. The process 1200 describes a mechanism for identifying relevant portions of knowledge from a set of derived knowledge, such as knowledge captured according to the processes described above with respect to FIGS. 5 and 9-11.

At action 1202, the process 1200 determines an ontology element (e.g., a portion of a database schema of saved modeling knowledge, such as described above with respect to FIGS. 5 and 6), and a value for that ontology element. The ontology element and associated value may be determined, for instance, based on user inputs logged during the interaction of the user with an authoring tool, such as described above with respect to FIGS. 1-11. For example, the user may enter text in a search field, and based on a selected task and the entered text, the process may identify a particular modeling task associated with a selected interface control and a text value associated with the entered text (e.g., "build new model" for the modeling task and "scrap" as the entered text). This information may be processed to identify the ontological element as "modeling goal" and an associated attribute as "scrap calculation." It should be appreciated that various techniques may be employed to associate the particular interaction with the particular element of the ontology, including allowing the user to explicitly define their modeling operation and inferring the modeling operation through the particular menus or interface controls selected by the user. Similarly, the value associated with the ontology element may be determined explicitly (e.g., the text entry field example described above), or implicitly through user interactions with the authoring tool.

The ontology element and associated value may be determined at various levels of granularity, and some embodiments may use multiple different ontology elements to narrow the scope of the query for relevant knowledge. For instance, a basic example may identify the ontology element as a "model build" task of a generic predictive model. A more advanced example may identify the ontology element as "model build" with an associated "asset type" ontology element with an attribute value of "aircraft engine". A yet further example may determine the ontology element as "model build", an "asset type" ontology element with an attribute type of "aircraft engine" and a sub-attribute of "engine serial number" with an attribute value of "ABC-123".

At action 1204, the ontology element and associated attribute value are used to query a set of derived knowledge. As described above with respect to FIGS. 5 and 6, the ontology may serve as the schema of a datastore in which the modeling knowledge is stored, such that the ontology element and associated attribute value serve to form the basis of a query executed against the derived knowledge. Results of this query may be returned in the form of particular entries within the datastore related to particular predictive models or modeling operations.

At action 1206, results of the query executed at action 1204 are programmatically curated, such as by a knowledge filter as described above with respect to FIG. 6. Curation of the query results may include pruning the returned results or applying various post-processing or analysis techniques to determine relevant knowledge to be provided via the authoring tool. This curation may include, without limitation, selecting only results that occur in at least a threshold number of returned records (e.g., to identify circumstances where a given modeling technique, parameter, or the like is used in at least a threshold percentage of modeling activities for a particular task), selecting only results that are associated with predictive models that have certain performance characteristics (e.g., based on received asset data indicating model error and accuracy), or the like.

At action 1208, the curated results are presented via an authoring interface. As an example, the curated results may be presented as initial parameters or suggested interface selections within an authoring interface, such that the curated results indicate the defaults or initial selections allowing the user to select those options or to change the selected options to other values. Alternatively, in other embodiments the curated results may be presented to the user for consideration in a separate window for informational purposes, displayed in a knowledge graph as described above with respect to FIGS. 8A-8C, or communicated to the user via a chat client as described with respect to FIG. 7. Thus, some embodiments may provide systems and methods that provide improved automated systems for authoring predictive models.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on industrial assets, any of the embodiments described herein could be applied to other types of systems.

The present invention has been described in terms of several embodiments solely for the purpose of illustration.

Persons skilled in the art will recognize from this description that the invention is not limited to the embodiments described, but may be practiced with modifications and alterations limited only by the spirit and scope of the appended claims.

The invention claimed is:

1. A computer system implementing a development environment for generating predictive models using model parameters provided by a predictive model authoring tool, the computer system comprising:
   the predictive model authoring tool configured to:
      develop a predictive analytic via a development interface of the predictive model authoring tool based on one or more user modeling task inputs provided to interface controls of the predictive model authoring tool;
      determine a modeling context for the predictive analytic based on modeling operations that are used to develop the predictive analytic;
      provide the modeling context, the one or more user modeling task inputs, and one or more model parameters of the predictive analytic to a model development context analyzer which determines a related element of an ontology related to the predictive analytic;
      query a database using the at least one element of the ontology, wherein the querying returns derived modeling knowledge including one or more recommended model parameters to be added to a machine learning model of the predictive analytic based on at least one of the provided modeling context, the one or more user modeling task inputs, or the one or more model parameters; and
   providing the one or more recommended model parameters of the machine learning model of the predictive analytic to the predictive model authoring tool.

2. The computer system of claim 1, wherein the set of derived modeling knowledge is displayed as a knowledge graph.

3. The computer system of claim 1, wherein the predictive model is executed via a model execution platform.

4. The computer system of claim 1, wherein the modeling context is determined based on an input to a menu for performing a modeling operation.

5. The computer system of claim 1, wherein the modeling context is captured from at least one of creation of a new model, editing of an existing model, or linking an existing model to a new asset.

6. The computer system of claim 5, wherein the modeling context further comprises a particular asset type.

7. A computer system comprising a processor configured to:
   receive context data based on one or more user interactions with a predictive model authoring tool during development of a predictive analytic via the predictive model authoring tool;
   determine at least one element of an ontology related to the predictive analytic based on a modeling task performed within the one or more user interactions;
   query a database using the at least one element of the ontology, wherein the query returns one or more recommended model parameters to be added to a machine learning model of the predictive analytic; and
   provide the one or more recommended model parameters for the machine learning model of the predictive analytic to the predictive model authoring tool for use in developing the predictive analytic.

8. The computer system of claim 7, wherein the one or more recommended model parameters are provided to the predictive model authoring tool formatted into a knowledge graph representation.

9. The computer system of claim 7, wherein the processor is further configured to:
   determine the at least one element of the ontology is associated with a modeling task currently being performed via the predictive model authoring tool.

10. The computer system of claim 9, wherein the context data comprises a set of input logs generated by the predictive model authoring tool during a modeling operation, and the system is further configured to process the context data to determine at least one modeling task attribute from the set of input logs.

11. The computer system of claim 10, wherein the context data further comprises a predefined context, and the at least one modeling task attribute is performed using an input to task mapping selected from a plurality of input to task mappings based at least in part on the predefined context.

12. The computer system of claim 7, wherein the ontology is stored as a tree structure, wherein at least one parent node of the tree structure represents a modeling task, and wherein at least one child node of the at least one parent node represents an attribute of the first modeling task.

13. The computer system of claim 12, wherein the child node is associated with a different modeling task from the first modeling task.

14. A method comprising:
   receiving, at a computing node, context data from a predictive model authoring tool, the context data comprising an input log of user interactions with the predictive model authoring tool during a development of a predictive analytic and predefined context indicating at least one modeling task performed during the user interactions represented in the input log;
   determining at least one element of an ontology based on the modeling task performed within the input log of user interactions;
   querying a database using the at least one element of the ontology, wherein the querying returns one or more recommended model parameters to be added to a machine learning model of the predictive analytic; and
   transmitting the one or more recommended model parameters of the machine learning model of the predictive analytic to the predictive model authoring tool.

15. The method of claim 14, wherein the one or more recommended model parameters are transmitted as a knowledge graph representation.

16. The method of claim 14, wherein the ontology is stored as a tree structure, wherein at least one parent node of the tree structure represents a modeling task, and wherein at least one child node of the at least one parent node represents an attribute of the modeling task.

17. The method of claim 14, wherein the at least one modeling task is at least one of data filtering, data preprocessing, data visualization, goal selection, or model parameter selection.

18. The method of claim 14, wherein the transmitted one or more recommended model parameters comprise at least one model parameter for use by the predictive model authoring tool as a suggested parameter.

19. The method of claim 14, wherein the querying further returns one or more predictive model types to use during training of the machine learning model.

* * * * *